United States Patent
Izawa et al.

(10) Patent No.: US 9,143,764 B2
(45) Date of Patent: Sep. 22, 2015

(54) IMAGE PROCESSING DEVICE, IMAGE PROCESSING METHOD AND STORAGE MEDIUM

(71) Applicant: FUJIFILM Corporation, Tokyo (JP)

(72) Inventors: Katsutoshi Izawa, Saitama (JP); Tomokazu Nakamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/873,753

(22) Filed: Apr. 30, 2013

(65) Prior Publication Data

US 2013/0235167 A1  Sep. 12, 2013

Related U.S. Application Data

(63) Continuation of application No. PCT/JP2011/073256, filed on Oct. 7, 2011.

(30) Foreign Application Priority Data

Nov. 5, 2010 (JP) ................................. 2010-249011

(51) Int. Cl.
*H04N 13/04* (2006.01)
*G03B 35/24* (2006.01)
(Continued)

(52) U.S. Cl.
CPC ............ *H04N 13/04* (2013.01); *G02B 27/2214* (2013.01); *G03B 35/24* (2013.01); *H04N 13/0022* (2013.01); *H04N 13/0497* (2013.01)

(58) Field of Classification Search
CPC .......... H04N 13/0271; H04N 13/0022; H04N 13/0497; H04N 13/0203; H04N 13/0409; H04N 13/0445; H04N 21/816; H04N 2013/0081; H04N 2013/0092; H04N 2013/0465; H04N 2213/008; G02B 27/2214; G06T 15/00
USPC .................................. 348/42, 51, 59; 345/419
See application file for complete search history.

(56) References Cited

U.S. PATENT DOCUMENTS

| | | | | |
|---|---|---|---|---|
| 7,167,188 | B2 * | 1/2007 | Redert | ........................... 345/660 |
| 7,388,583 | B2 * | 6/2008 | Redert | ........................... 345/422 |

(Continued)

FOREIGN PATENT DOCUMENTS

| | | |
|---|---|---|
| CN | 101651842 A | 2/2010 |
| JP | 2004-7396 A | 1/2004 |

(Continued)

OTHER PUBLICATIONS

Chinese Office Action, dated Oct. 28, 2014, in related Chinese Application No. CN 201180052327.8, along with an English translation thereof.

*Primary Examiner* — Sath V Perungavoor
*Assistant Examiner* — Nathnael Aynalem
(74) *Attorney, Agent, or Firm* — Birch, Stewart, Kolasch & Birch, LLP.

(57) ABSTRACT

An image processing device includes: a size acquisition section that acquires a first display size of an output target display device that performs 3D display; a storage section that stores respective parallax amounts adjusted by a user during performing 3D display of 3D display image data respectively on display devices of different types, and stores respective second display sizes of the display devices; a parallax amount computation section that computes a parallax amount for the first display size based on a relationship between the parallax amounts and the second display sizes stored in the storage section; and an output section that outputs to the output target display device the computed parallax amount and the 3D display image data.

22 Claims, 18 Drawing Sheets

LARGE SCREEN 3D TV

(51) Int. Cl.
*H04N 13/00* (2006.01)
*G02B 27/22* (2006.01)

(56) References Cited

U.S. PATENT DOCUMENTS

| | | | | |
|---|---|---|---|---|
| 8,120,606 B2 * | 2/2012 | Nakamura et al. | | 345/419 |
| 8,208,008 B2 * | 6/2012 | Oota et al. | | 348/42 |
| 8,294,711 B2 * | 10/2012 | Yahagi | | 345/419 |
| 8,369,607 B2 * | 2/2013 | Mashitani et al. | | 382/154 |
| 8,482,598 B2 * | 7/2013 | Hiramatsu et al. | | 348/46 |
| 8,565,516 B2 * | 10/2013 | Morifuji et al. | | 382/154 |
| 8,629,870 B2 * | 1/2014 | Oota et al. | | 345/419 |
| 8,629,899 B2 * | 1/2014 | Raveendran et al. | | 348/43 |
| 8,711,204 B2 * | 4/2014 | Smolic et al. | | 348/43 |
| 8,831,337 B2 * | 9/2014 | Barnum | | 382/154 |
| 2002/0024592 A1 | 2/2002 | Uomori et al. | | 348/42 |
| 2009/0142041 A1 * | 6/2009 | Nagasawa et al. | | 386/124 |
| 2009/0237494 A1 * | 9/2009 | Oota et al. | | 348/51 |
| 2010/0039504 A1 * | 2/2010 | Takahashi et al. | | 348/54 |
| 2010/0085423 A1 * | 4/2010 | Lange | | 348/46 |
| 2010/0091093 A1 * | 4/2010 | Robinson | | 348/47 |
| 2010/0238264 A1 * | 9/2010 | Liu et al. | | 348/14.13 |
| 2011/0018968 A1 * | 1/2011 | Shikata et al. | | 348/47 |
| 2011/0032338 A1 * | 2/2011 | Raveendran et al. | | 348/51 |
| 2011/0080466 A1 * | 4/2011 | Kask et al. | | 348/43 |
| 2011/0150421 A1 * | 6/2011 | Sasaki et al. | | 386/241 |
| 2011/0228059 A1 * | 9/2011 | Nagai | | 348/54 |
| 2012/0327200 A1 | 12/2012 | Takahashi et al. | | |

FOREIGN PATENT DOCUMENTS

| | | |
|---|---|---|
| JP | 2005-73012 A | 3/2005 |
| JP | 2006-333400 A | 12/2006 |
| JP | 2010-45584 A | 2/2010 |
| JP | 2011-193348 A | 9/2011 |
| WO | WO 2010090150 A1 * | 8/2010 |
| WO | WO 2010/146847 A1 | 12/2010 |

* cited by examiner

LARGE SCREEN 3D TV

UNKNOWN 3D DISPLAY DEVICE

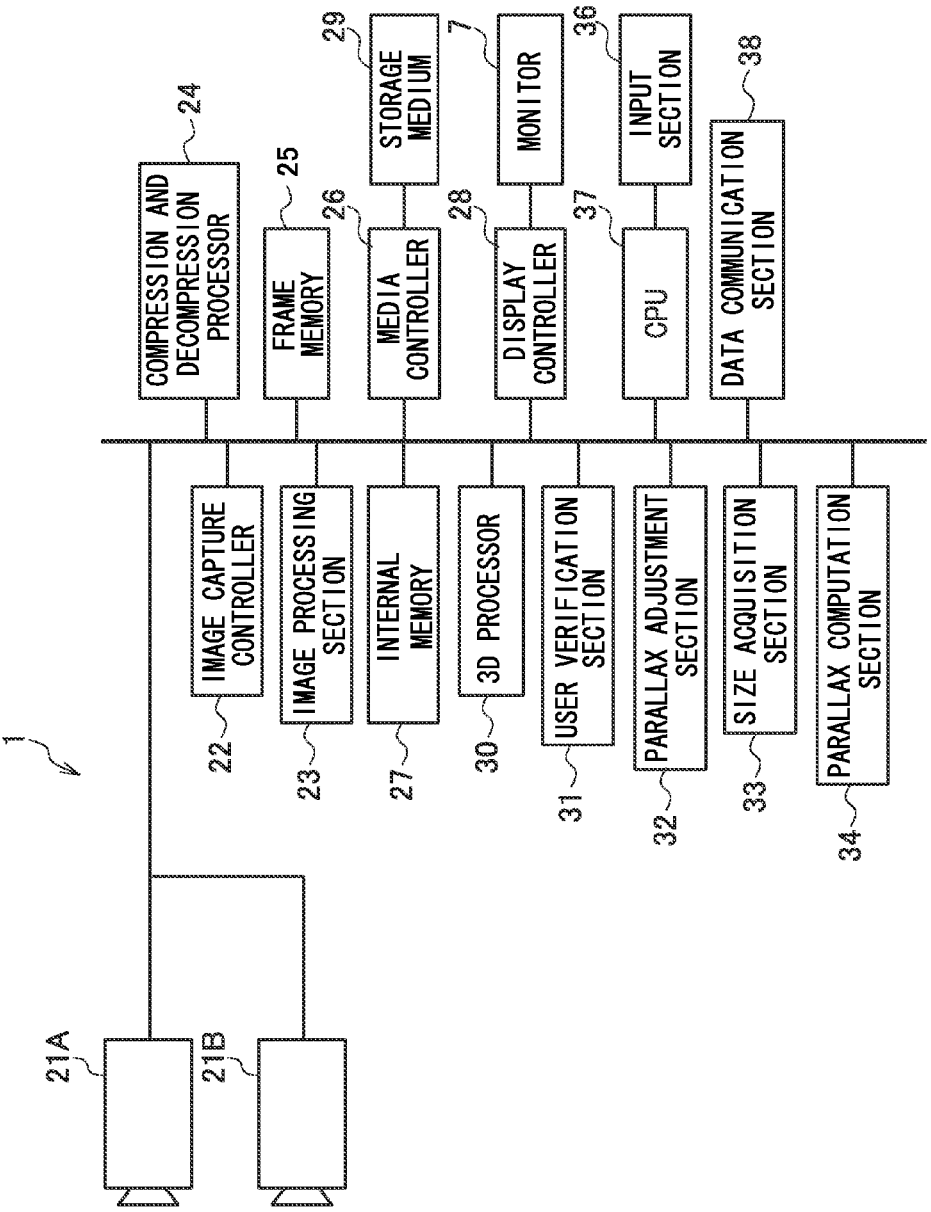

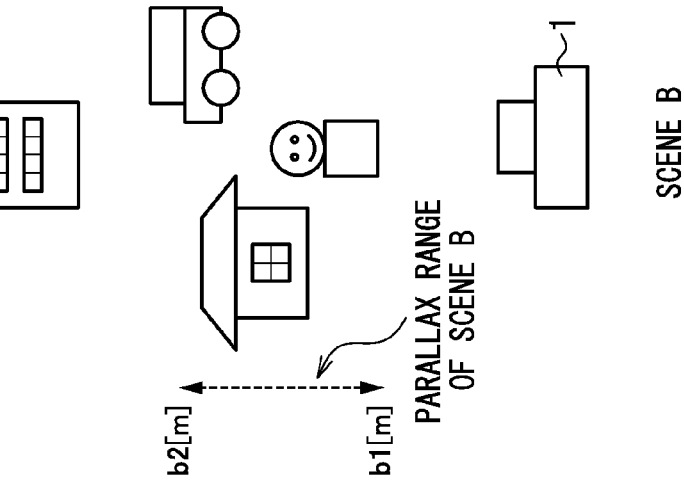
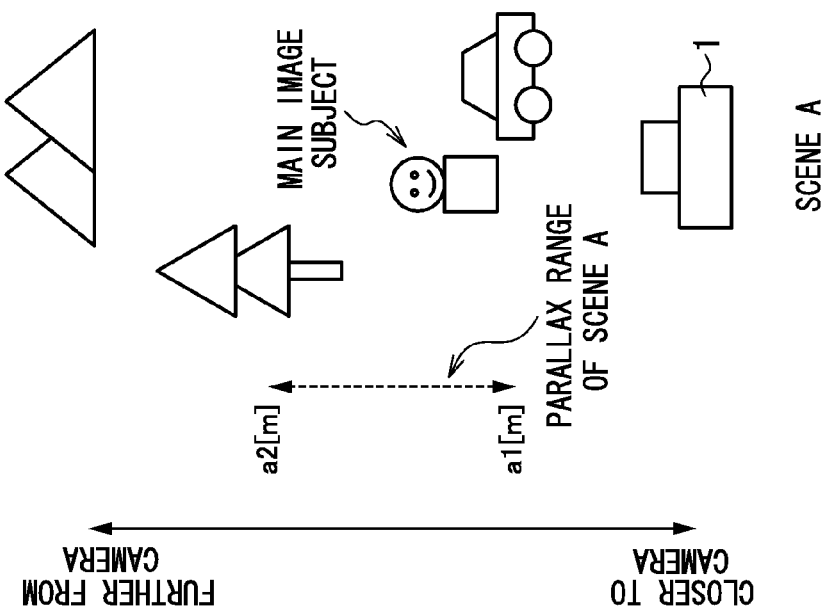

IMAGE PROCESSING DEVICE, IMAGE PROCESSING METHOD AND STORAGE MEDIUM

CROSS-REFERENCE TO RELATED APPLICATIONS

This application is a continuation application of International Application No. PCT/JP/2011/073256, filed on Oct. 7, 2011, which is incorporated herein by reference. Further, this application claims priority over Japanese Patent Application No. 2010-249011, filed on Nov. 5, 2010, the entire content of which is incorporated by reference into the present specification.

BACKGROUND OF THE INVENTION

1. Field of the Invention

The present invention relates to an image processing device, an image processing method, and a storage medium, and in particular relates to an image processing device, an image processing method, and a storage medium that output stereoscopic (3D) display image data to a display device.

2. Related Art

A stereoscopic image processing method has been conventionally known in which a correct parallax for a user acquired by a first display device is read into a second display device, parallax of a parallax image is adjusted at the second display device according to the read correct parallax, and the parallax image after adjustment is output from the second display device (for example, Japanese Patent Application Laid-Open (JP-A) No. 2004-7396).

A stereoscopic image generating device has been also known in which a stereoscopic image for the right eye and a stereoscopic image for the left eye is generated by converting a right eye image and a left eye image based on a display screen size and a viewing distance (for example, JP-A No. 2006-333400). In this stereoscopic image generating device, right eye and left eye positions of a viewer, a display screen region, and preset right eye image and left eye image display regions corresponding to the position of the viewer are set in a virtual space as a virtual right eye position, a virtual left eye position, a virtual display screen region and a virtual standard display region, based on display screen information (data) indicating the size of the display screen on which the stereoscopic image for the right eye and the stereoscopic image for the left eye are to be displayed, the position of the viewer, and the position of the display screen.

However, in the technology disclosed in JP-A No. 2004-7396, since manual parallax adjustment results for a display device is adjusted and used in another display device, an error in the parallax is liable to be larger in cases in which there is a large size difference between the display devices.

In the technology disclosed in JP-A No. 2006-333400, parallax adjustment must be performed each time in order to accommodate individual personal differences in stereognostic (3D) sensation.

SUMMARY

In consideration of the above circumstances, the present invention provides an image processing device, method and storage medium that can automatically compute an appropriate parallax amount for each of plural types of display device.

A first aspect of the present invention is an image processing device including: a size acquisition section that acquires a first display size of an output target display device that performs 3D display; a storage section that stores respective parallax amounts adjusted by a user during performing 3D display of 3D display image data respectively on display devices of different types, and stores respective second display sizes of the display devices; a parallax amount computation section that computes a parallax amount for the first display size based on a relationship between the parallax amounts and the second display sizes stored in the storage section; and an output section that outputs to the output target display device the computed parallax amount and the 3D display image data.

A second aspect of the present invention is an image processing method including: storing respective parallax amounts adjusted by a user during performance of 3D display of 3D display image data respectively on display devices of different types, and respective second display sizes of the display devices; acquiring a first display size of an output target display device that performs 3D display; computing a parallax amount for the first display size based on a relationship between the stored parallax amounts and the stored second display sizes; and outputting to the output target display device the computed parallax amount and the 3D display image data.

A third aspect of the present invention is a non-transitory storage medium storing a program that causes a computer to execute image processing, the image processing including: storing respective parallax amounts adjusted by a user during performance of 3D display of 3D display image data respectively on display devices of different types, and respective second display sizes of the display devices; acquiring a first display size of an output target display device that performs 3D display; computing a parallax amount for the first display size based on a relationship between the stored parallax amounts and the stored second display sizes; and outputting to the output target display device the computed parallax amount and the 3D display image data.

According to the first aspect, the size acquisition section acquires the first display size of the output target display device that performs 3D display. The parallax amount computation section computes a parallax amount for the first display size acquired by the size acquisition section based on a relationship between the parallax amounts and the second display sizes stored by the storage section. The output section outputs to the output target display device the parallax amount computed by the parallax amount computation section and 3D display image data.

Accordingly, an appropriate parallax amount can be automatically computed for plural types of display device by computing a parallax amount for the display size of the output target display device based on the relationship between parallax amounts adjusted by the user and display sizes.

The image processing device of the first aspect may further include: a type acquisition section that acquires a type of the output target display device; and a correction section that, corrects the computed parallax amount according to a predetermined viewing distance for the acquired type, wherein the output section outputs to the output target display device the parallax amount corrected by the correction section and the 3D display image data. Accordingly, the parallax amount can be corrected more appropriately according to the determined viewing distance for the type of display device.

The image processing device of the first aspect may further include a reception section that receives user data indicating a user, wherein the storage section stores the respective parallax amounts adjusted by the user and the respective second display sizes in association with each user data; and the parallax amount computation section computes the parallax amount for the first display size based on the relationship between the parallax amounts and the second display sizes stored in the storage section, which corresponds to the user data received by the reception section. Accordingly, an appropriate parallax amount can be computed for each user.

The image processing device of the first aspect including the reception section may further include: a type acquisition section that acquires a type of the output target display device; and a correction section that, corrects the computed parallax amount according to the acquired type and a predetermined viewing distance corresponding to the received user data, wherein the output section outputs to the output target display device the parallax amount corrected by the correction section and the 3D display image data. Accordingly, the parallax amount can be corrected more appropriately for each user according to the determined viewing distance for the type of display device.

The image processing device of the first aspect may further include: a display section that performs 3D display; a measuring section that measures a viewing distance from the display section to a user; and a correction section that compares a predetermined viewing distance corresponding to the first display size and the viewing distance measured by the measuring section, and corrects the computed parallax amount based on a result of comparison, wherein the output section outputs to the output target display device the parallax amount corrected by the correction section and the 3D display image data. Accordingly, the parallax amount can be corrected more appropriately according to the viewing distance of a user.

The image processing device of the first aspect may further include a parallax range acquisition section that acquires a parallax range of an image subject from the 3D display image data, wherein in a case in which second 3D display image data that is different from first 3D display image data for which a parallax amount has been adjusted is to be output, the parallax amount computation section computes a parallax amount of the second 3D display image data based on the parallax range acquired from the first 3D display image data, the parallax range acquired from the second 3D display image data, and the parallax amount of the first 3D display image data, and the output section outputs to the output target display device the computed parallax amount and the second 3D display image data. Accordingly, an appropriate parallax amount can be computed for 3D display image data that is different from 3D display image data for which the parallax amount has been adjusted.

The image processing device of the first aspect may further include an image subject distance acquisition section that acquires an image subject distance from 3D display image data, wherein in a case in which second 3D display image data that is different from first 3D display image data for which a parallax amount has been adjusted is to be output, the parallax amount computation section computes a parallax amount of the second 3D display image data based on the image subject distance acquired from the first 3D display image data, the image subject distance acquired from the second 3D display image data, and the parallax amount of the first 3D display image data, and the output section outputs to the output target display device the computed parallax amount and the second 3D display image data. Accordingly, an appropriate parallax amount can be computed for 3D display image data that is different from 3D display image data for which the parallax amount has been adjusted.

The image processing device of the first aspect may further include a display section that performs 3D display.

The image processing device of the first aspect may further include an image capture section that captures plural images from plural different viewpoints, wherein the output section outputs the captured plural images as the 3D display image data.

As described above, according to the aspects of the present invention an appropriate parallax amount can be automatically computed for respective plural types of display device by computing a parallax amount for the display size of an output target display device based on a relationship between parallax amounts adjusted by a user and display sizes.

BRIEF DESCRIPTION OF THE DRAWINGS

Detailed explanation follows regarding exemplary embodiments of the present invention, with reference to the following drawings.

FIG. 4 is a schematic block diagram illustrating an internal configuration of a multi-lens digital camera according to a first present exemplary embodiment.

FIG. 14A is a diagram explaining a parallax range of an image subject.

FIG. 14B is a diagram explaining a parallax range of an image subject.

DETAILED DESCRIPTION

Exemplary embodiments are described hereinafter in cases in which an image processing device is applied to a multi-lens digital camera.

Figure 1:
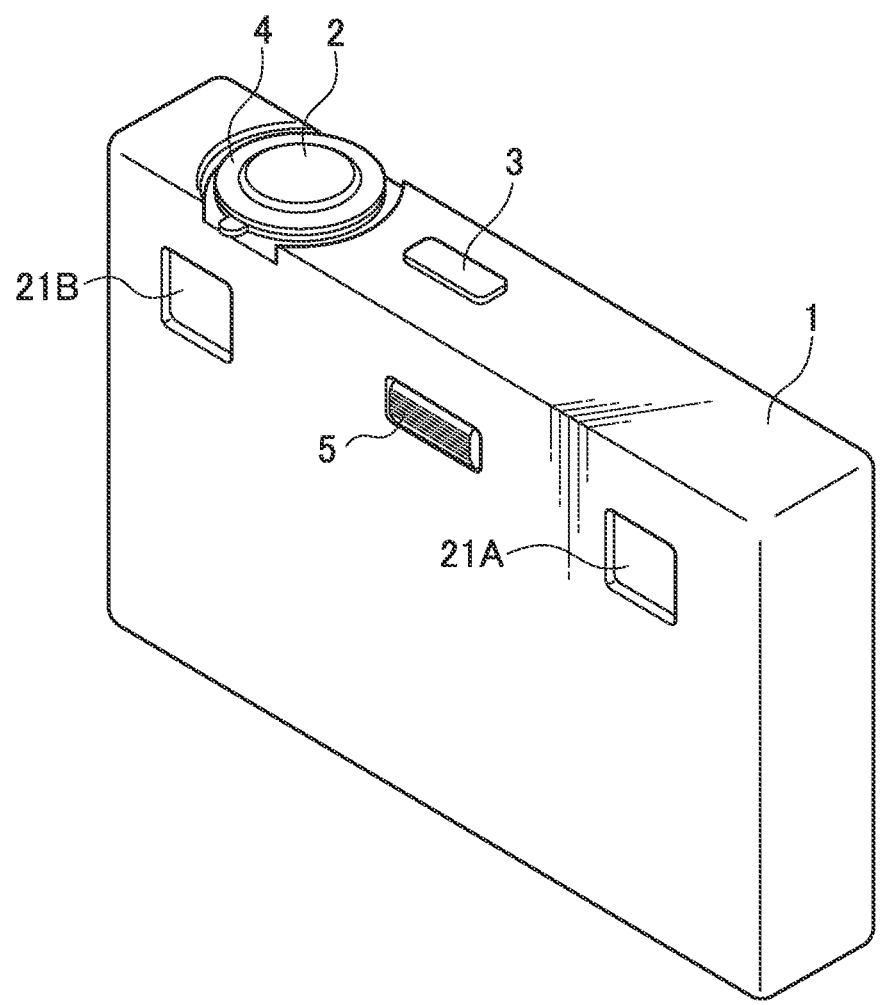
FIG. 1 is a front side perspective view of a multi-lens digital camera according to exemplary embodiments.
Figure 2:
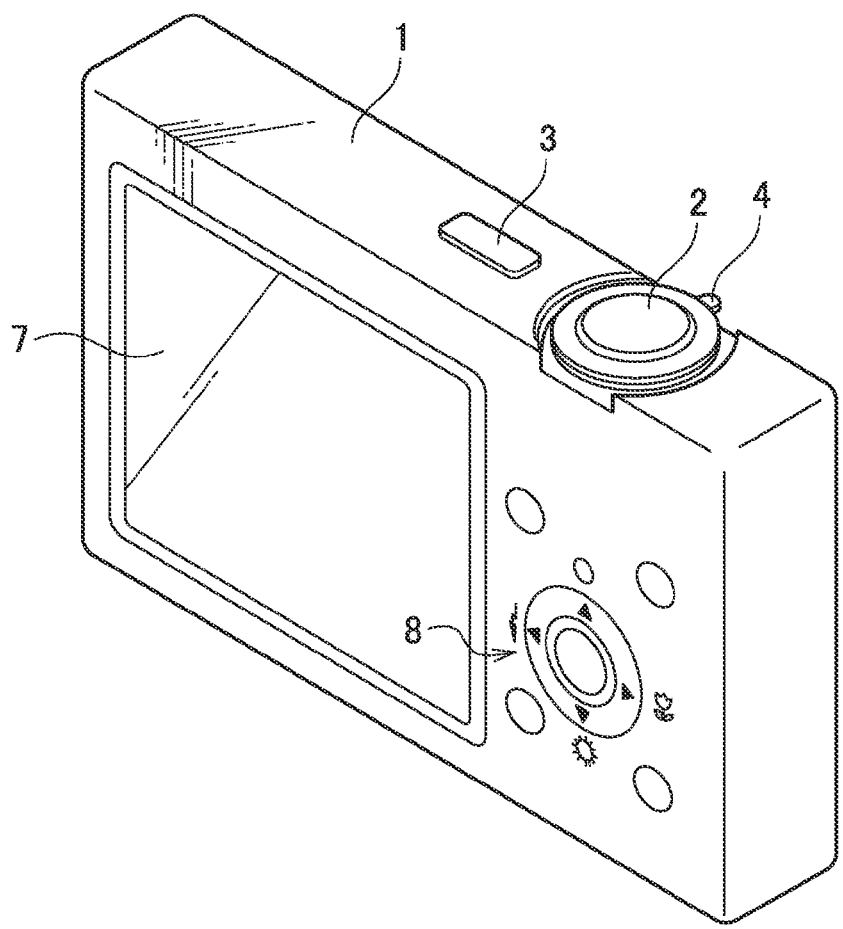
FIG. 2 is a back side perspective view of the multi-lens digital camera according to exemplary embodiments.

FIG. 1 is a front side perspective view illustrating a multi-lens digital camera 1 according to a first exemplary embodiment, and FIG. 2 is a back side perspective view thereof. As shown in FIG. 1, a release button 2, a power button 3 and a zoom lever 4 are provided at an upper portion of the multi-lens digital camera 1. A flash 5 and lenses of two image capture sections 21A, 21B are disposed on the front face of the multi-lens digital camera 1. A liquid crystal monitor 7 for performing various types of display and a button 8 for various operations are disposed on the back face of the multi-lens digital camera 1.

Figure 3A:
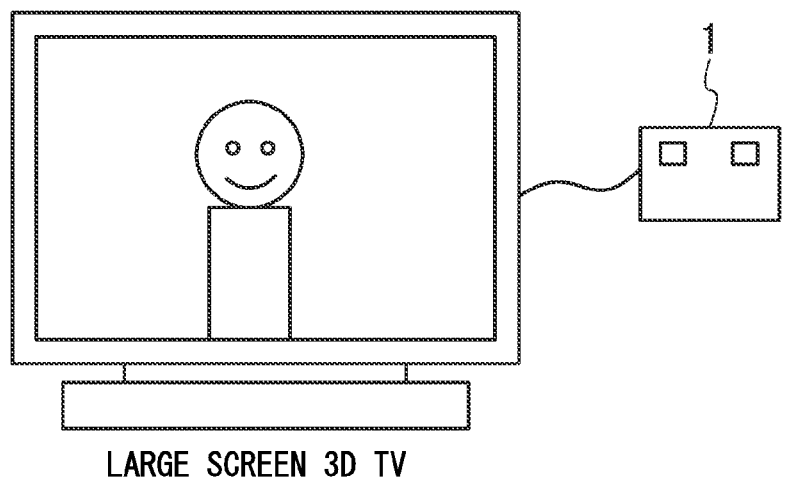
FIG. 3A is a drawing illustrating the multi-lens digital camera that has been connected to a 3D display enabled television.
Figure 3B:
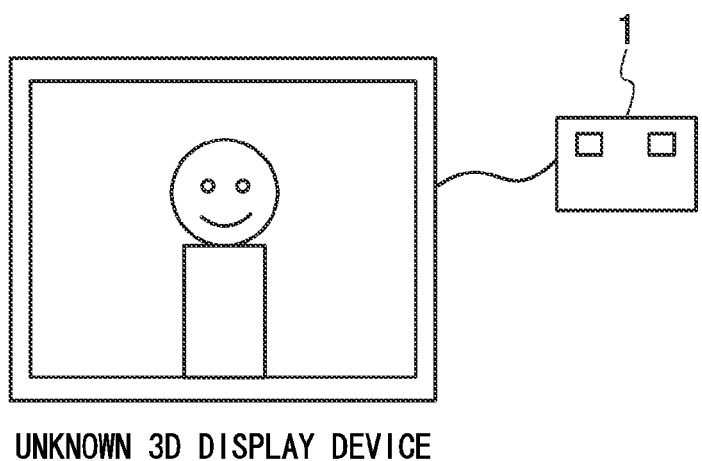
FIG. 3B is a drawing illustrating the multi-lens digital camera that has been connected to an unknown 3D display enabled display device.

As shown in FIG. 3A and FIG. 3B, the multi-lens digital camera 1 can be connected through a cable to various types of display device such as 3D display televisions, and image data is output from the multi-lens digital camera 1 to the various types of display device.

FIG. 4 is a schematic block diagram illustrating an internal configuration of the multi-lens digital camera 1. As shown in FIG. 4, the multi-lens digital camera 1 includes the two image capture sections 21A, 21B, an image capture controller 22, an image processing section 23, a compression/decompression processor 24, a frame memory 25, a media controller 26, an internal memory 27, a display controller 28, an input section 36, a CPU 37 and a data communication section 38. The image capture sections 21A, 21B are respectively disposed with an angle of convergence that focuses on an image subject and with a predetermined base line length. Data for the angle of convergence and the base line length are stored in the internal memory 27.

The image capture controller 22 includes an AF processor and an AE processor, which are not shown in the drawings. In response to the release button 2 being pressed halfway, the AF processor determines a focal region of the lens based on a pre-image acquired by the image capture sections 21A, 21B, and determines a focal position of the lens, and outputs these data to the image capture sections 21A, 21B. The AF processor determines the focal position of the lens by using an image subject region as the focal region. The AE processor determines an aperture number and shutter speed based on the pre-image, and outputs these data to the image capture sections 21A, 21B.

In response to the release button 2 being fully pressed, the image capture controller 22 instructs, in a multi-lens mode, acquisition of a main image to the image capture section 21A for a left image, and to the image capture section 21B for a right image. Prior to the operation of the release button 2, the image capture controller 22 instructs the image capture sections 21A, 21B to sequentially acquire real-time images having a smaller number of pixels than the main image at specific time intervals (for example, intervals of 1/30 second) in order to allow a user to check an image capture range.

The image processing section 23 performs image processing such as white balance adjustment, shading correction, sharpness correction and color correction on digital image data of the left image and the right image acquired by the image capture sections 21A, 21B.

The compression/decompression processor 24 performs compression processing with a compression format such as JPEG on image data expressing the left image and the right image that has been processed by the image processing section 23, and generates a stereoscopic (3D) image file. This 3D image file includes image data of the left image and the right image, and stores ancillary data such as the base line length, angle of convergence, and date and time of image capture, as well as viewpoint data expressing a viewpoint position, in an Exif format or the like. Distance data of an image subject computed from the focal position of the lens is also stored in the 3D image file.

The frame memory 25 is a working memory used for performing various types of processing, including the previously mentioned processing performed by the image processor 23, on the image data expressing the left image and the right image acquired by the image capture sections 21A, 21B.

The media controller 26 accesses a storage medium 29 and controls writing and reading of data such as image files.

The internal memory 27 stores items such as width of the display size of the liquid crystal monitor 7, various constants set in the multi-lens digital camera 1 and programs executed by the CPU 37.

The display controller 28 displays on the liquid crystal monitor 7 a 3D image generated from the left image and the right image that are stored in the frame memory 25 during image capture, a left image and a right image, or a 3D image that are stored in the storage medium 29. The display controller 28 also displays real-time images on the liquid crystal monitor 7.

The storage medium 29 is configured by, for example, a memory card. The storage medium 29 is an example of a storage section.

Figure 5:
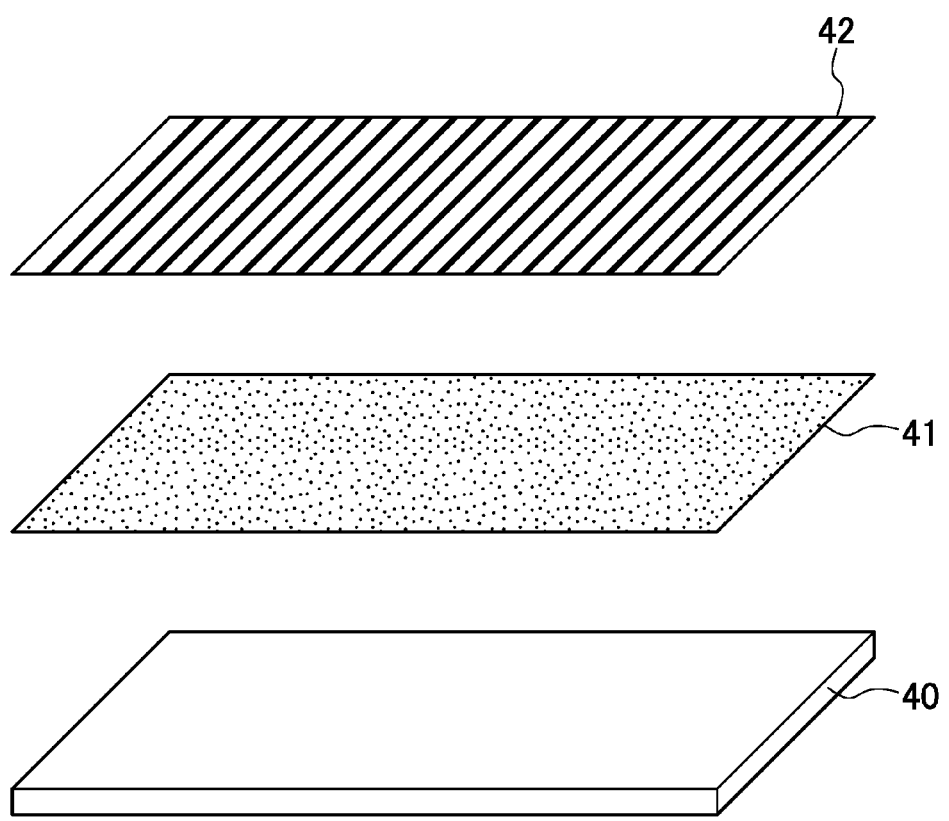
FIG. 5 is a diagram illustrating a configuration of a liquid crystal monitor.

FIG. 5 is an exploded perspective view illustrating a configuration of the liquid crystal monitor 7. As shown in FIG. 5, the liquid crystal monitor 7 is configured with stacked layers of a back light unit 40 that emits LED light and a liquid crystal panel 41 for performing various displays, with a lenticular sheet 42 attached on top face of the liquid crystal panel 41.

Figure 6:
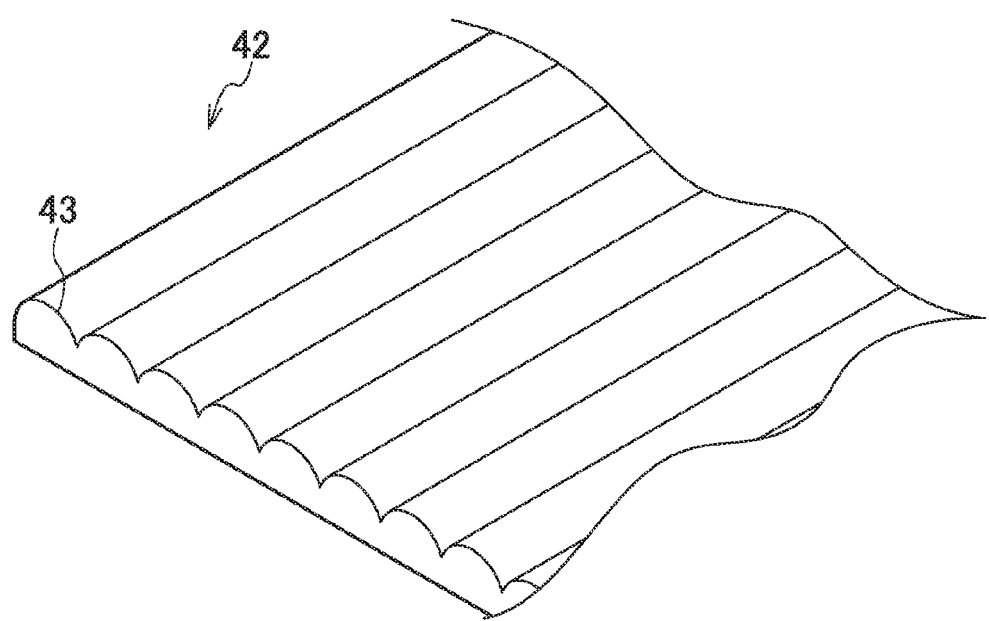
FIG. 6 is a diagram illustrating a configuration of a lenticular sheet.

FIG. 6 is a diagram illustrating a configuration of a lenticular sheet. As shown in FIG. 6, the lenticular sheet 42 is configured with plural cylindrical lenses 43 disposed side-by-side in a row along the direction of the base line.

When the multi-lens digital camera 1 is connected through a cable to another display device, the data communication section 38 performs data communication with the other display device.

The multi-lens digital camera 1 further includes a 3D processor 30, a user verification section 31, a parallax adjustment section 32, a size acquisition section 33, and a parallax computation section 34.

The 3D processor 30 performs 3D processing on a left image and a right image to generate a 3D image in order to perform 3D display of the left image and the right image on the liquid crystal monitor 7.

Figure 7:
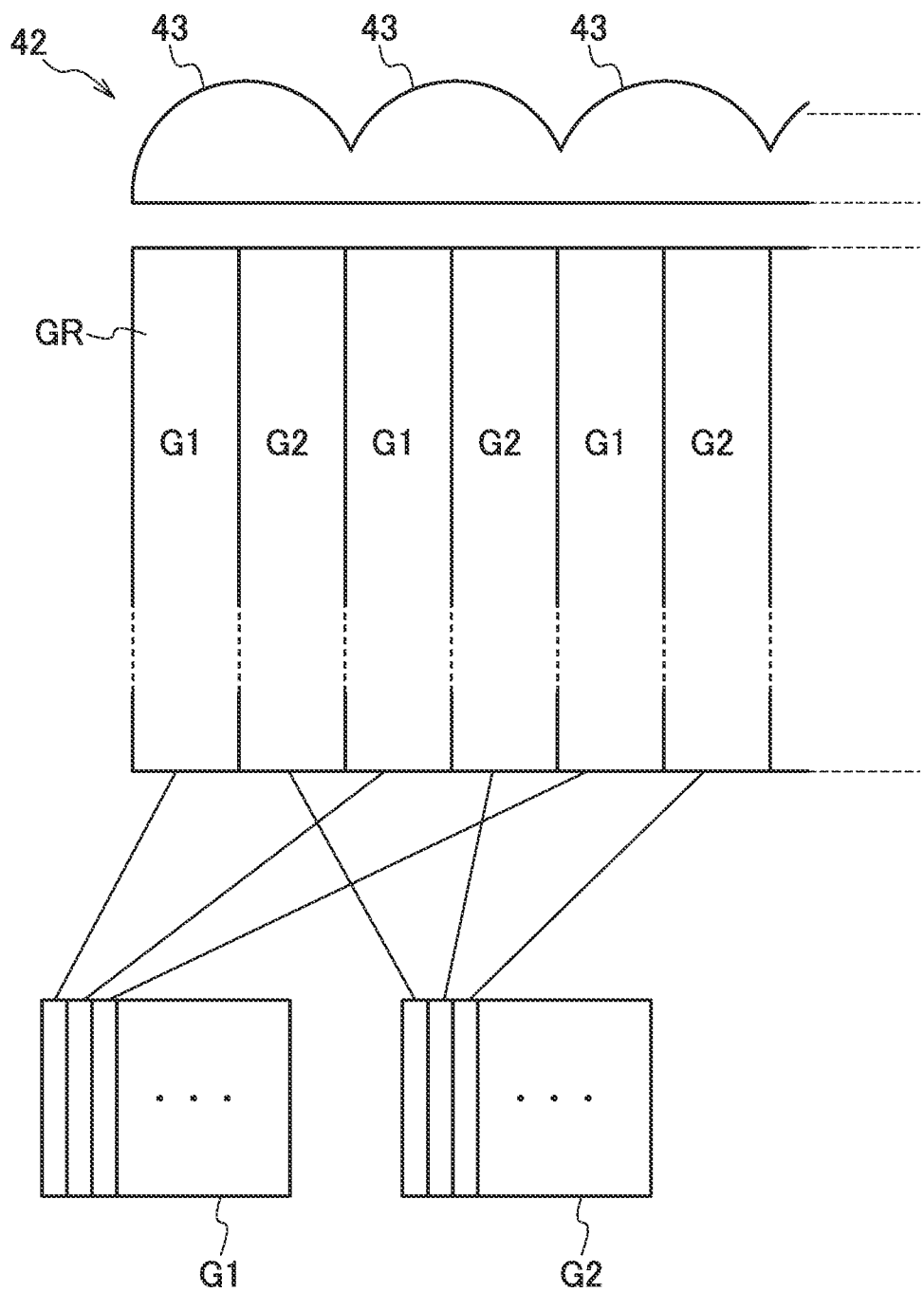
FIG. 7 is a diagram explaining 3D processing of a right image and a left image.

FIG. 7 is a diagram explaining 3D processing on a left image G1 and a right image G2. As shown in FIG. 7, the 3D processor 30 performs 3D processing by cutting the left image G1 and the right image G2 into strip shapes along a direction perpendicular to the base line, and alternately disposing the cut strip shapes of the left image G1 and the right-image G2 at corresponding positions on each of the cylindrical lenses 43 of the lenticular sheet 42, thereby generating a 3D image GR. Image pairs of the left image G1 and the right image G2 configuring the 3D image GR are respectively disposed in correspondence with each individual cylindrical lens.

The user verification section 31 receives a user ID input by a user operating the input section 36, cross-checks the user ID against a pre-stored list of user IDs, and performs user verification. The user verification section 31 is an example of a reception section.

The parallax adjustment section 32 adjusts parallax of the left image G1 and the right image G2 according to operation of the input section 36 by the user. Here, parallax refers to an amount of displacement in pixel positions in the lateral direction, namely in the direction along the base line, between the left image G1 and the right image G2 for image subjects included in both the left image G1 and the right image G2. The user is able to appropriately set the 3D sensation of image subjects included in the 3D image GR by manually adjusting the parallax.

The parallax adjustment section 32 adjusts parallax of the left image and the right image of a 3D image file that has been stored in advance in the storage medium 29, and stores the adjustment results in the 3D image file. The parallax adjustment section 32 also stores the display size (for example, the lateral width of the display screen) of the liquid crystal monitor 7 associated with the adjustment results in the 3D image file.

The parallax adjustment section 32 may also output the 3D image file to another display device through the data communication section 38 and, while displaying a 3D display of the 3D image file on the another display device, adjust parallax of the left image and the right image of the 3D image file on the 3D display according to user operation of the input section 36. In such cases, the parallax adjustment section 32 stores the adjustment results in the 3D image file. The parallax adjustment section 32 further stores the display size (for example, the lateral width of the display screen) of the another display device acquired by the size acquisition section 33 (described later) associated with the adjustment results in the 3D image file.

The size acquisition section 33 acquires, in a case in which the 3D image file is output through the data communication section 38 to another display device and is displayed in 3D on the another display device, the display size (for example, the lateral width of a display screen) from the another display device through the data communication section 38.

After the display size of another display device has been acquired by the size acquisition section 33, the parallax computation section 34 computes the parallax of the left image and the right image corresponding to the display size of the another display device, based on the parallax adjustment results stored in the 3D image file.

The parallax computation section 34 computes, in cases in which there are two parallax adjustment results stored in the 3D image file, parallax for the left image and the right image corresponding to the display size of another display device acquired by the size acquisition section 33, according to a linear function expressing a relationship between display size and parallax based on the two parallax adjustment results.

Figure 8:
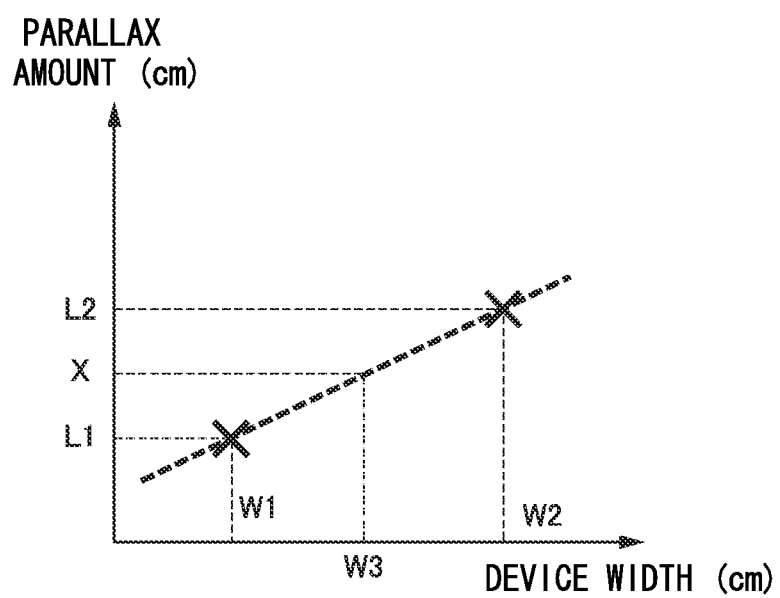
FIG. 8 is a diagram explaining a method of computing a slope and intercept of a linear function based on respective combinations of adjusted parallax amounts and display device widths.

For example, in a case in which the width of the display size of the liquid crystal monitor 7 is W1 cm and a parallax adjustment result thereof by a user's manual operation is L1 cm, and the width of the display size of another display device is W2 cm and a parallax adjustment result thereof by a user's manual operation is L2 cm, then, as shown in FIG. 8, a slope A and intercept B of a linear function x=AW+B that expresses a relationship between display size and parallax is derived according to the following formula.

$$A=(L2-L1)/(W2-W1)$$

$$B=(L1 \times W2-L2 \times W1)/(W2-W1)$$

A parallax x of the left image and the right image is computed for a display size W3 of another display device acquired by the size acquisition section 33 according to a linear function derived as described above. Namely, the parallax x is expressed by the following formula.

$$x=(L2-L1)/(W2-W1) \times (W3-W1)+L1$$

Moreover, in cases in which three or more parallax adjustment results are stored in the 3D image file, the parallax computation section 34 computes parallax for the left image and the right image for the display size of another display device acquired by the size acquisition section 33, according to a linear function expressing a relationship between display size and parallax based on the three or more parallax adjustment results.

Figure 9:
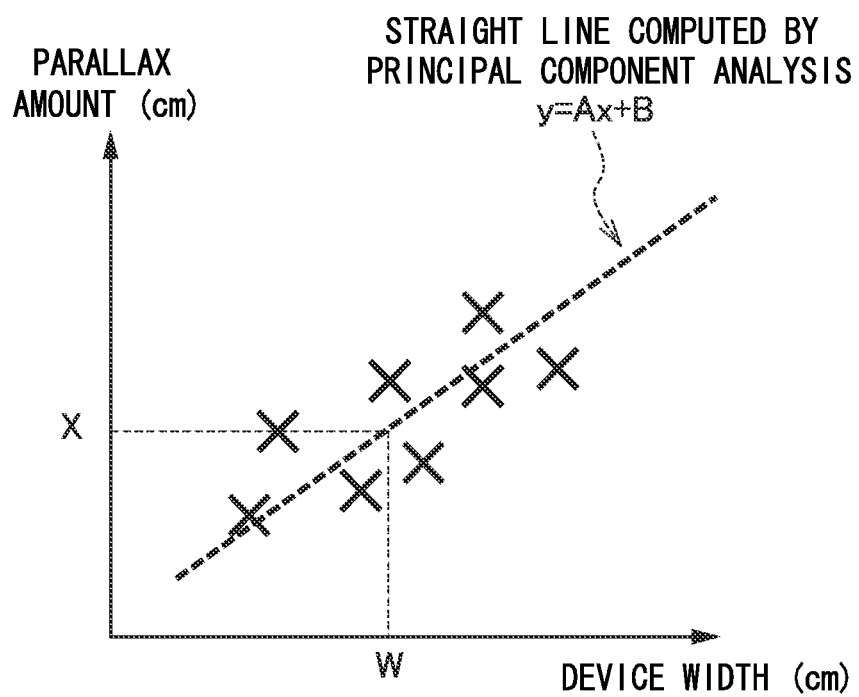
FIG. 9 is a diagram explaining a method of computing a slope and intercept of a linear function based on respective combinations of adjusted parallax amounts and display device widths using principal component analysis.

For example, three or more sets of combinations of display size and parallax adjustment result are plotted as shown in FIG. 9, and a straight line expressing a principal component (the linear function x=AW+B, with slope A and intercept B, expressing a relationship between display size and parallax) is derived through principal component analysis.

Slope A and intercept B are expressed by the following formula.

$$A=(NR-PQ)/(NP'-P^2)$$

$$B=(P'Q-PR)/(NP-P^2)$$

Where $P=W1+W2+\ldots+WN$, $P'=W1^2+W2^2+\ldots+WN^2$, $Q=L1+L2+\ldots+LN$, $R=W1 \cdot L1+W2 \cdot L2+\ldots+WN \cdot LN$, and N is the number of data sets. The parallax x of the left image and the right image are computed for the display size W of the another display device acquired by the size acquisition section 33 based on a linear function having the slope and intercept derived by the principal component analysis described above.

Explanation now follows regarding operation of the multi-lens digital camera 1 of the first exemplary embodiment. Firstly, in response to an operation of a user via the input section 36 to input a user ID, the multi-lens digital camera 1 performs user verification. The multi-lens digital camera 1 also performs 3D processing on the left image and the right image of a specific 3D image file that has been stored in advance in the storage medium 29, to generate a 3D image, and displays the left image and the right image in a 3D form on the liquid crystal monitor 7. After the user adjusts the parallax of the left image and the right image via the input section 36, the parallax adjustment results and the width of the display size of the liquid crystal monitor 7 are stored in association with the user ID in the specific 3D image file in the multi-lens digital camera 1.

Next, the multi-lens digital camera 1 may be connected through a cable to another (second) display device (for example, a 3D display television) as shown in FIG. 3A, and the specific 3D image file stored in advance in the storage medium 29 is output to the second display device. The second display device performs 3D display of the left image and the right image of the specific 3D image file. The user then adjusts the parallax of the left image and the right image via the input section 36 of the multi-lens digital camera 1, and the parallax adjustment results and the width of the display size of the second display device are stored in association with the user ID in the specific 3D image file in the multi-lens digital camera 1.

Figure 10:
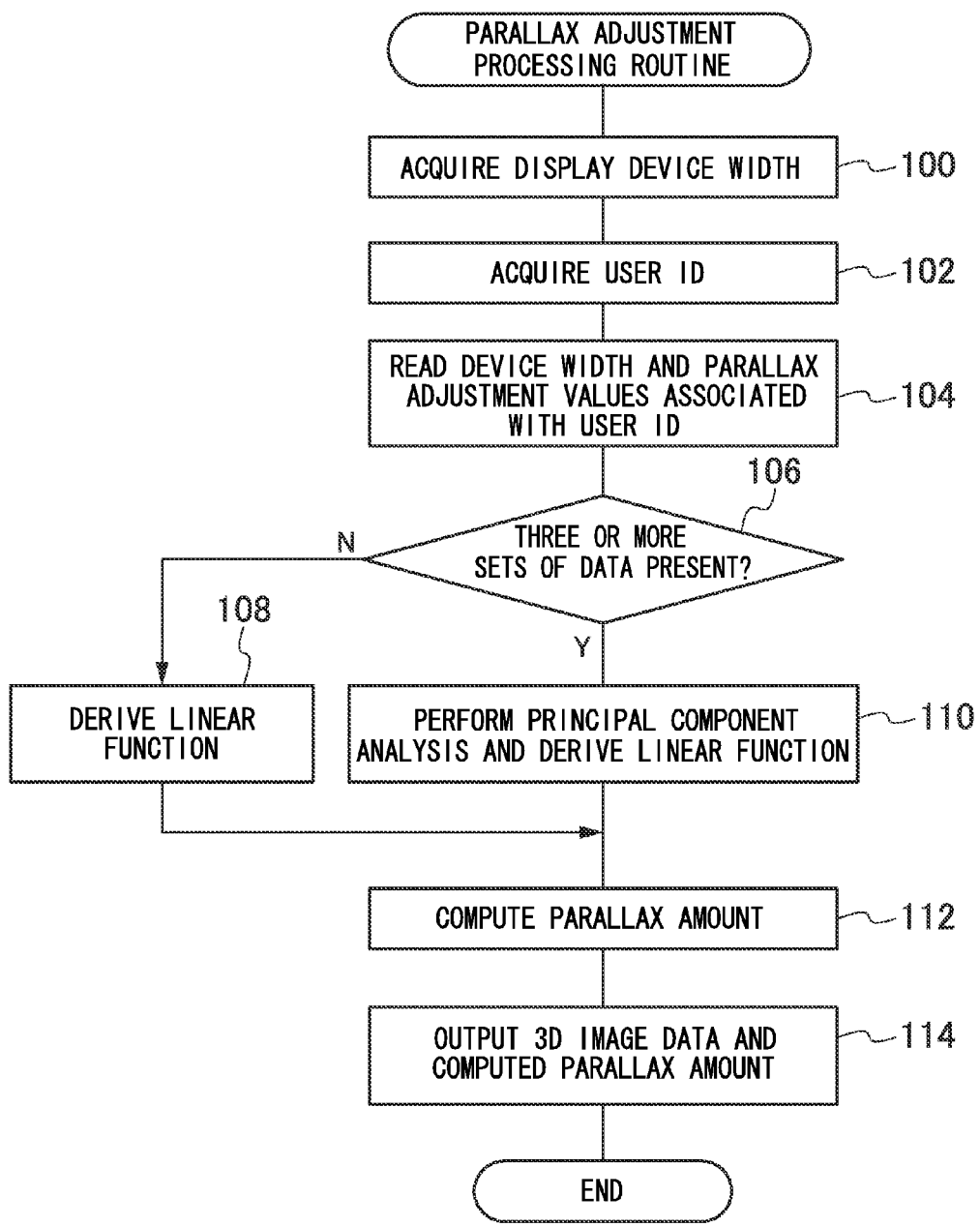
FIG. 10 is a flow chart illustrating a parallax adjustment processing routine of the first exemplary embodiment.
Figure 11:
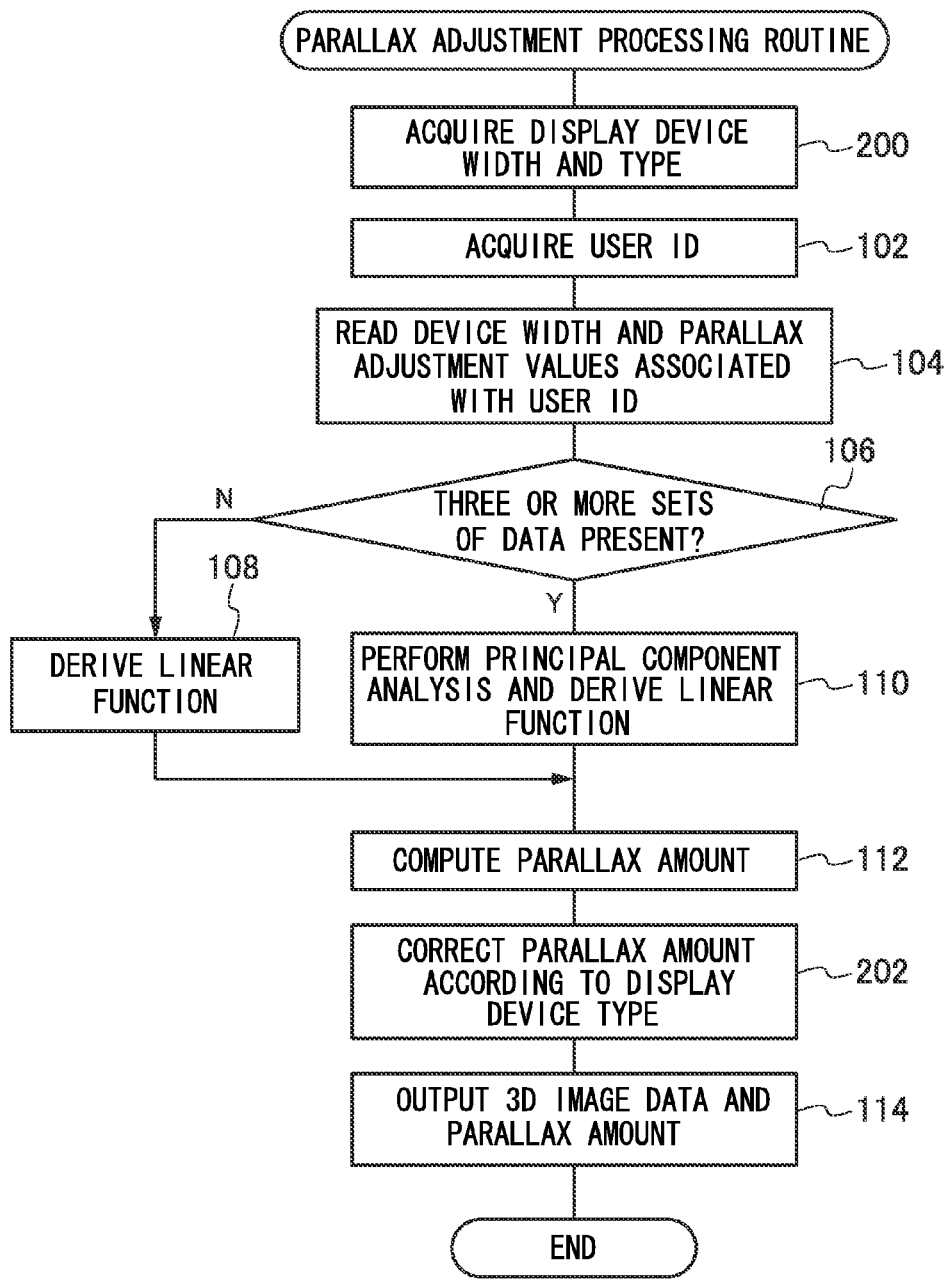
FIG. 11 is a flow chart illustrating a parallax adjustment processing routine of a second exemplary embodiment.

The multi-lens digital camera 1 may be further connected through a cable to yet another (third) display device as shown in FIG. 3B, and a parallax adjustment processing routine illustrated in FIG. 10 is executed by the CPU 37 of the multi-lens digital camera 1.

First, at step 100, the width of the display size is acquired from the third display device connected to the multi-lens digital camera 1. At step 102, a user-verified user ID is acquired, and at step 104, plural combinations of parallax adjustment results and display widths of display devices stored in association with the acquired user ID are read from the specific 3D image file that is stored in the storage medium 29.

Then at step 106, determination is made as to whether or not the number of data sets (the number of combinations of parallax adjustment results and display widths of display devices) acquired at step 104 is three or greater. If the number of acquired data sets is two, at step 108, the slope and intercept of a linear function expressing a relationship between display size and parallax are derived based on the two combinations of parallax adjustment results and display widths of display devices acquired at step 104. However, if it is determined at step 106 that the number of acquired data sets is three or more, at step 110, principal component analysis is performed based on the three or more combinations of parallax adjustment results and display widths of display devices acquired at step 104, and a linear function expressing a relationship between display size and parallax is derived.

At the next step 112, a parallax amount corresponding to the width of the display size acquired at step 100 is computed according to the linear function derived at step 108 or at step 110. Then at step 114, the parallax amount computed at step 112 and the specific 3D image file are output to the display device connected to the multi-lens digital camera 1, and the parallax adjustment processing routine is ended.

The display device may perform 3D display of the left image and the right image of the specific 3D image file at the computed parallax amount.

As described above, according to the multi-lens digital camera of the first exemplary embodiment, appropriate parallax amounts can be automatically computed for plural types of display devices by computing a parallax amount for the width of the display size of an output destination display device based on a relationship between parallax amounts that have been manually adjusted by a user and widths of display sizes.

The user can thereby eliminate the effort of adjusting the parallax to a desired amount each time when the display device to which the 3D image file is output changes.

Moreover, the precision of the computed parallax amount can be increased as the number of adjustment results of parallax amount which are manually adjusted by the user increases.

Further, an appropriate parallax adjustment amount can be computed for an unknown 3D display device for which manual parallax adjustment has not been performed, by using different widths of the display sizes of plural 3D display devices and corresponding parallaxes that the user has manually adjusted therefor. As long as the width of the display size is known, parallax reflecting the personal preferences of a user can be set automatically for any display device.

Explanation follows regarding a second exemplary embodiment. Since the configuration of a multi-lens digital camera of the second exemplary embodiment is similar to that of the multi-lens digital camera 1 of the first exemplary embodiment, the same reference numerals are allocated and further explanation thereof is omitted.

The second exemplary embodiment differs from the first exemplary embodiment in the point that a computed parallax amount is corrected according to the type of display device.

In the multi-lens digital camera according to the second exemplary embodiment, after a 3D image file is output to another display device through a data communication section 38 and 3D display is performed on the another display device, the size acquisition section 33 acquires the width of the display size and acquires the display device type (for example, television, photo frame, or liquid crystal of a digital camera) from the another display device through the data communication section 38. The size acquisition section 33 is an example of a size acquisition section and a type acquisition section.

After the display size of the another display device has been acquired by the size acquisition section 33, the parallax computation section 34 computes parallax for a left image and a right image corresponding to the display size of the another display device based on parallax adjustment results stored in the 3D image file. Moreover, the parallax computation section 34 corrects the computed parallax according to a predetermined viewing distance tendency for the type of the another display device. For example, in the case of a photo frame, for a given width of display size, a user will tend to view from close proximity (i.e., there is a tendency towards a short viewing distance with respect to the width of display size) and, therefore, correction is made so as to reduce the parallax amount. In the case of a television, for a given width of display size, a user will tend to view from a greater distance (i.e., there is a tendency towards a large viewing distance with respect to the width of display size) and, therefore, correction is made so as to increase the parallax amount.

Explanation follows regarding a parallax adjustment processing routine according to the second exemplary embodiment. The processing similar to that of the first exemplary embodiment is allocated the same reference numerals and detailed explanation thereof is omitted.

Firstly, at step 200, the width of display size and display device type are acquired from the display device to which the multi-lens digital camera 1 is connected. At step 102, a user-verified user ID is acquired, and at step 104 plural combinations of parallax adjustment results and display widths of display devices stored in association with the acquired user ID are read from a specific 3D image file that is stored in the storage medium 29.

Then at step 106, determination is made as to whether or not the number of data sets acquired at step 104 is three or greater. In a case in which the number of acquired data sets is two, at step 108, the slope and intercept of a linear function expressing a relationship between display size and parallax are derived. However, in a case in which it is determined at step 106 that the number of acquired data sets is three or more, at step 110, principal component analysis is performed and a linear function expressing a relationship between display size and parallax is derived.

At the next step 112, a parallax amount corresponding to the width of display size acquired at step 100 is computed according to the derived linear function. Then, at step 202, the parallax amount computed at step 112 is corrected according to the display device type acquired at step 200.

At the next step 114, the specific 3D image file and the parallax amount corrected at step 202 are output to the display device connected to the multi-lens digital camera 1, and the parallax adjustment processing routine is ended.

As described above, according to the multi-lens digital camera of the second exemplary embodiment, a desirable parallax for a user can be achieved without influence from variations in viewing distance (viewing distance tendency) arising from differences between the types of display device.

Next, explanation follows regarding a third exemplary embodiment. Since a configuration of a multi-lens digital camera of the third exemplary embodiment is similar to that of the multi-lens digital camera 1 of the first exemplary embodiment, the same reference numerals are allocated and further explanation thereof is omitted.

The third exemplary embodiment differs from the first exemplary embodiment in the point that a computed parallax amount is corrected according to viewing distance tendency for each user.

In the multi-lens digital camera according to the third exemplary embodiment, after a 3D image file is output to another display device through a data communication section 38 and 3D display is performed on the another display device, the size acquisition section 33 acquires the width of display size and acquires the display device type (for example, television, photo frame, or liquid crystal display of a camera) from the another display device through the data communication section 38.

After the display size of the another display device has been acquired by the size acquisition section 33, the parallax computation section 34 computes parallax for a left image and a right image corresponding to the display size of the another display device based on parallax adjustment results stored in the 3D image file. Moreover, the parallax computation section 34 corrects the computed parallax amount according to a viewing distance tendency for the type of the another display device, which has been set in advance in association with the user ID. For example, in a case in which a tendency of very close viewing distance of television has been set in association with the user ID of a user A, correction is made so as to reduce the parallax amount.

Viewing distance tendencies with respect to display device type for each user ID may be manually set by user's operation of the input section 36. The viewing distance tendencies with respect to display device type set for each user ID are stored in the storage medium 29.

Figure 12:
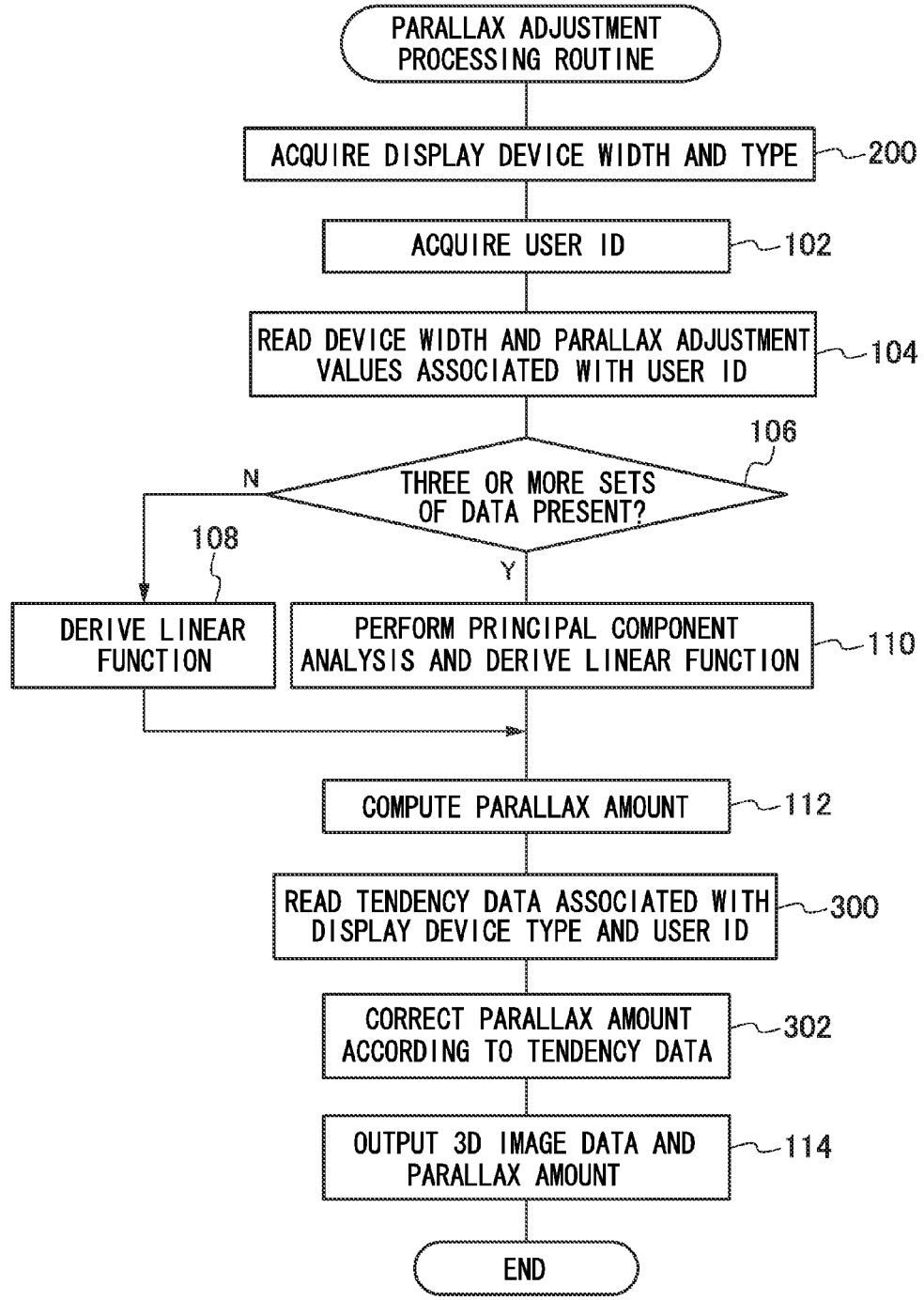
FIG. 12 is a flow chart illustrating a parallax adjustment processing routine of a third exemplary embodiment.

Explanation follows regarding a parallax adjustment processing routine of the multi-lens digital camera of the third exemplary embodiment with reference to FIG. 12. The processing similar to the parallax adjustment processing routine of the first exemplary embodiment is allocated the same reference numerals and detailed explanation thereof is omitted.

Firstly, at step 200, the width of display size and display device type are acquired from the display device to which the multi-lens digital camera 1 is connected. At step 102, a user-verified user ID is acquired, and at step 104, plural combinations of parallax adjustment results and display widths of display devices stored in association with the acquired user ID are read from a specific 3D image file that is stored in the storage medium 29.

Then at step 106, determination is made as to whether or not the number of data sets acquired at step 104 is three or greater. In a case in which the number of acquired data sets is two, at step 108, the slope and intercept of a linear function expressing a relationship between display size and parallax are derived. However, in a case in which at step 106 the number of acquired data sets is three or more, at step 110, principal component analysis is performed and a linear function expressing a relationship between display size and parallax is derived.

At the next step 112, a parallax amount corresponding to the width of display size acquired at step 100 is computed according to the derived linear function. Then, at step 300, a viewing distance tendency stored in association with the acquired user ID and display device type is read from the storage medium 29.

At step 302, the parallax amount computed at step 112 is corrected according to the viewing distance tendency read at step 300.

At the next step 114, the designated 3D image file is output together with the parallax amount corrected at step 302 to the display device connected to the multi-lens digital camera 1, and the parallax adjustment processing routine is ended.

As described above, according to the multi-lens digital camera of the third exemplary embodiment, a desirable parallax can be achieved for each user without being influenced by personal variations in viewing distance.

The technology for correcting parallax amount described in the third exemplary embodiment may also be applied to the second exemplary embodiment described above.

Explanation follows regarding a fourth exemplary embodiment. Since the configuration of a multi-lens digital camera of the fourth exemplary embodiment is similar to that of the multi-lens digital camera 1 of the first exemplary embodiment, the same reference numerals are allocated and further explanation thereof is omitted.

The fourth exemplary embodiment differs from the first exemplary embodiment in the point that in cases in which an image file that is different from a specific 3D image file for which the parallax has been adjusted is to be output, a parallax amount of the different image file is computed based on the adjusted parallax amount of the specific 3D image file and the distance to the image subject.

In the multi-lens digital camera according to the fourth exemplary embodiment, in a case in which an image file that is different from the specific 3D image file in which the parallax has been adjusted is output to another display device through the data communication section 38 and 3D display is performed on the another display device, the parallax computation section 34 computes parallax for a left image and a right image of the different image file, which is an output target, based on the parallax adjustment results and the distance data of the image subject that are stored in the specific 3D image file, and based on the distance data of the image subject stored in the output target image file.

For example, a parallax amount for the left image and the right image is computed for the output target image file by taking γ times a parallax amount computed for the specific 3D image file, where γ is computed according to the formula below.

$$\gamma = \text{(distance data of image subject of output target image file)/(distance data of image subject of specific 3D image file)}$$

Explanation follows regarding operation of the multi-lens digital camera 1 of the fourth exemplary embodiment.

Firstly, a user operates the input section 36 and adjusts parallax for a left image and a right image for the liquid crystal monitor 7 of the multi-lens digital camera 1 and for another display device, respectively. Each combination of parallax adjustment result and width of display size is stored in association with a user ID in a specific 3D image file in the multi-lens digital camera 1.

Then, in a case in which the multi-lens digital camera 1 is connected to yet another display device through a cable as shown in FIG. 3B, the parallax adjustment processing routine illustrated in FIG. 10 is executed by the CPU 37 of the multi-lens digital camera 1.

Figure 13:
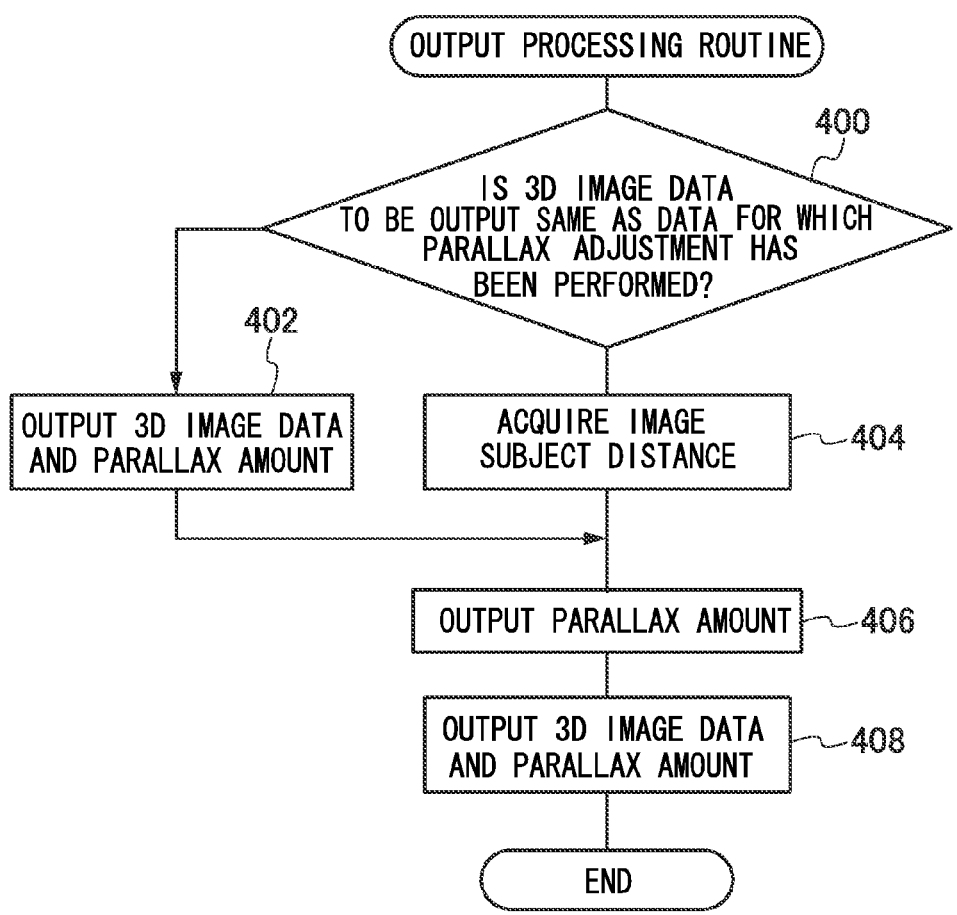
FIG. 13 is a flow chart illustrating an output processing routine of a fourth exemplary embodiment.

Moreover, in cases in which a user operates the input section 36 of the multi-lens digital camera 1 so as to output another (different) 3D image file from the multi-lens digital camera 1 to the yet another display device, an output processing routine illustrated in FIG. 13 is executed by the CPU 37 of the multi-lens digital camera 1.

Firstly, at step 400, determination is made as to whether or not an output target 3D image file is the same as the specific 3D image file for which parallax adjustment has been performed. If the output target 3D image file is the same as the specific 3D image file for which parallax adjustment has been performed, at step 402, the parallax amount computed in the parallax adjustment processing routine described above and the specific 3D image file are output to the display device connected to the multi-lens digital camera 1, and the output processing routine is ended.

However, if it is determined at step 400 that the output target 3D image file is different from the specific 3D image file for which parallax adjustment has been performed, then at step 404, distance data of image subject stored in the output target 3D image file and distance data of image subject stored in the specific 3D image file are acquired.

Then, at step 406, a parallax amount is computed based on the distance data of image subject acquired at step 404 and the parallax amount computed in the above parallax adjustment processing routine. At the next step 408, the output target 3D image file and the parallax amount computed at step 406 are output to the display device connected to the multi-lens digital camera 1, and the output processing routine is ended.

The display device performs 3D display of the left image and the right image of the output target 3D image file using the computed parallax amount.

As described above, according to the multi-lens digital camera of the fourth exemplary embodiment, a desirable parallax for a user can be achieved regardless of distance to an image subject stored in a 3D image file.

The technology of computing a parallax amount of an image file that is different from an image file for which the parallax has been adjusted described in the fourth exemplary embodiment may also be applied to the second exemplary embodiment or the third exemplary embodiment described above.

Explanation follows regarding a fifth exemplary embodiment. Since the configuration of a multi-lens digital camera of the fifth exemplary embodiment is similar to that of the multi-lens digital camera 1 of the first exemplary embodiment, the same reference numerals are allocated and further explanation thereof is omitted.

The fifth exemplary embodiment differs from the first exemplary embodiment in the point that in a case in which an image file that is different from a specific 3D image file for which the parallax has been adjusted is output, a parallax amount is computed based on the adjusted parallax amount of the specific 3D image file and the parallax range of image subject.

In the multi-lens digital camera according to the fifth exemplary embodiment, in a case in which an image file that is different from the specific 3D image file for which the parallax has been adjusted is output to another display device through the data communication section 38, and 3D display is performed on the another display device, the parallax computation section 34 computes parallax for a left image and a right image of the different image file, which is an output target, based on parallax adjustment results stored in the specific 3D image file, and a parallax range of image subject derived for the specific 3D image file, and on a parallax range of image subject derived for the output target image file.

For example, in a case in which the parallax range of image subject for the specific 3D image file is a1 [m] to a2 [m] as shown in FIG. 14A, and the parallax range of image subject for the output target image file is b1 [m] to b2 [m] as shown in FIG. 14B, the parallax amount of the left image and right image of the output target image file is computed by taking κ times the parallax amount computed for the specific 3D image file, where κ is computed according to the formula below.

$$\kappa = (b1+b2)/(a1+a2)$$

The parallax range of image subject is derived as follows. Firstly, from one or more image subjects in an image, for example, image subjects with a certain level or greater edge component (high frequency component), image subjects with a certain level or greater parallax, or image subjects that satisfy both of these conditions are extracted. Then, the image subject that has the shortest distance from the multi-lens digital camera 1 and the image subject that has the greatest distance from the multi-lens digital camera 1 are identified amongst the extracted image subjects, and a distance along the optical axis between these two image subjects is taken as the parallax range. At this time, in cases other than close-up image capture, image subjects at a distance too close to the multi-lens digital camera (for example, 0.5 m or less) are excluded from the image subjects used for the determination of the parallax range of image subject.

Explanation follows regarding operation of the multi-lens digital camera 1 of the fifth exemplary embodiment.

Firstly, a user operates the input section 36 and adjusts parallax of left image and right image for the liquid crystal monitor 7 of the multi-lens digital camera 1 and for another display device, respectively. Each combination of parallax adjustment result and width of display size is stored in association with a user ID in a specific 3D image file in the multi-lens digital camera 1.

Next, in a case in which the multi-lens digital camera 1 is connected through a cable to yet another display device, as shown in FIG. 3B, the parallax adjustment processing routine illustrated in FIG. 10 is executed by the CPU 37 of the multi-lens digital camera 1.

Figure 15:
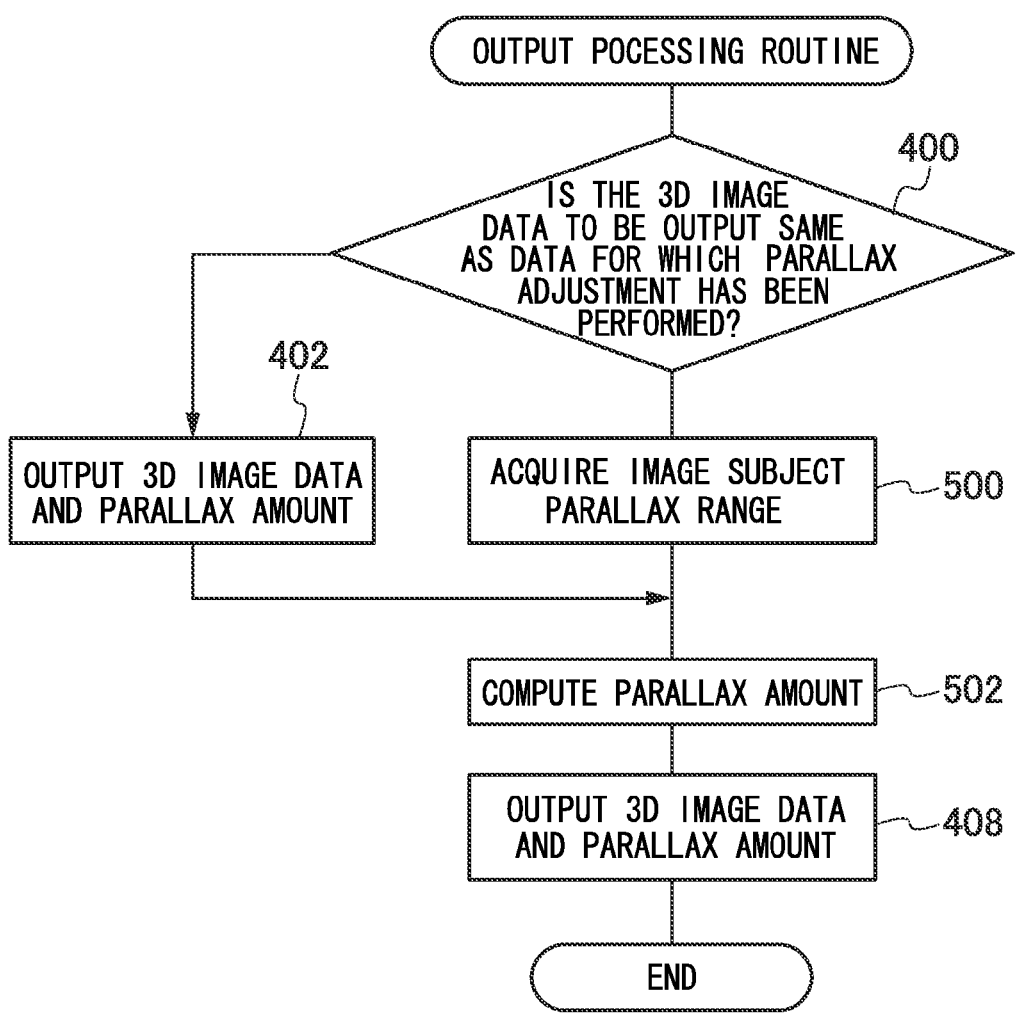
FIG. 15 is a flow chart illustrating an output processing routine of a fifth exemplary embodiment.

Further, in a case in which the input section 36 of the multi-lens digital camera 1 is operated by a user so as to output a separate (different) 3D image file from the multi-lens digital camera 1 to the another display device, an output processing routine illustrated in FIG. 15 is executed by the CPU 37 of the multi-lens digital camera 1.

Firstly, in step 400, determination is made as to whether or not the output target 3D image file is the same as the specific 3D image file for which parallax adjustment has been performed. If the output target 3D image file is the same as the specific 3D image file for which parallax adjustment has been performed, at step 402, the parallax amount computed in the parallax adjustment processing routine described above and the specific 3D image file are output to the display device connected to the multi-lens digital camera 1, and the output processing routine is ended.

However, if it is determined at step 400 that the output target 3D image file is different from the specific 3D image file for which parallax adjustment has been performed, at step 500, an parallax range of image subject is derived for the specific 3D image file and an parallax range of image subject is derived for the output target 3D image file.

Then, at step 502, a parallax amount is computed based on the parallax ranges of image subject derived at step 500 and the parallax amount computed in the parallax adjustment processing routine above. At the next step 408, the output target 3D image file and the parallax amount computed at step 502 are output to the display device connected to the multi-lens digital camera 1, and the output processing routine is ended.

The display device performs 3D display of the left image and the right image of the output target 3D image file using the computed parallax amount.

As described above, according to the multi-lens digital camera of the fifth exemplary embodiment, a desirable parallax for a user can be achieved regardless of the parallax range of image subject of a 3D image file.

The technology for computing a parallax amount for an image file that is different from an image file for which the parallax has been adjusted described in the fifth exemplary embodiment may also be applied to the second exemplary embodiment or the third exemplary embodiment described above.

Embodiments are not limited to the configurations described in the first exemplary embodiment to the fifth exemplary embodiment, in which the image processing device is applied to a multi-lens digital camera, and the image processing device may also be applied to other types of 3D display devices.

Explanation follows regarding a sixth exemplary embodiment. In the present exemplary embodiment, explanation is given regarding an example in which the image processing device is applied to each of plural types of display devices including a multi-lens digital camera. Since the configuration of the multi-lens digital camera of the sixth exemplary embodiment is similar to that of the multi-lens digital camera 1 of the first exemplary embodiment, the same reference numerals are allocated and further explanation thereof is omitted.

The sixth exemplary embodiment differs from the first exemplary embodiment in the point that parallax adjustment and parallax amount computation are performed in each of the plural 3D display devices.

Figure 16:
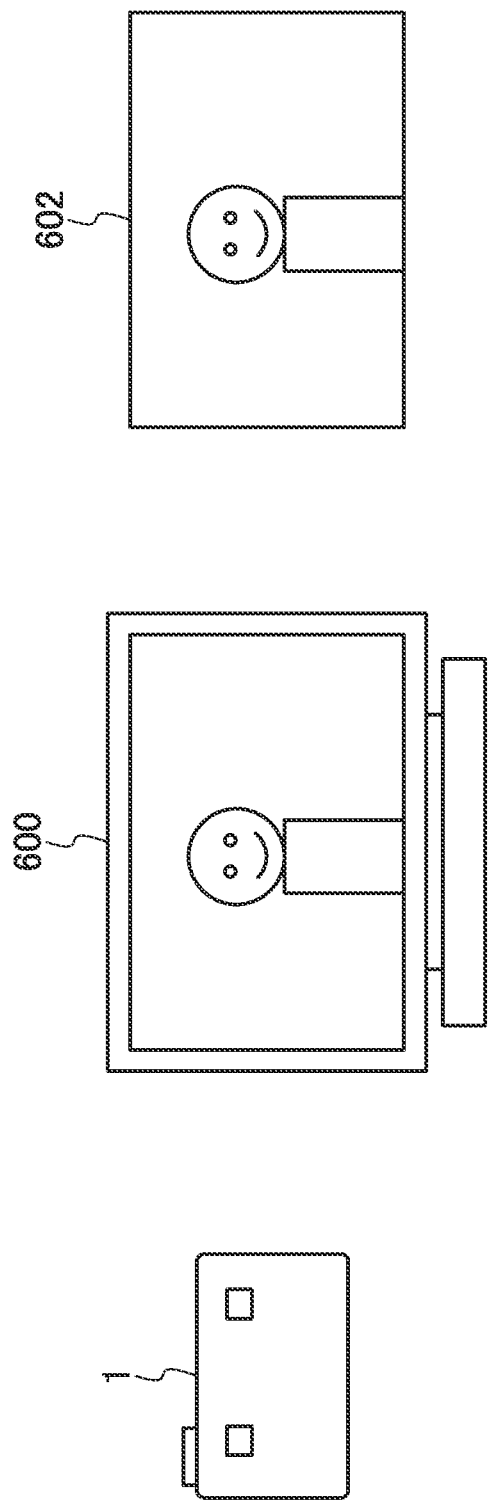
FIG. 16 is a diagram illustrating 3D display being performed by plural types of display devices in which 3D display is possible.

In the sixth exemplary embodiment, as shown in FIG. 16, plural types of 3D display devices including the multi-lens digital camera 1 mutually transfer 3D image files through a portable storage medium 29.

Figure 17:
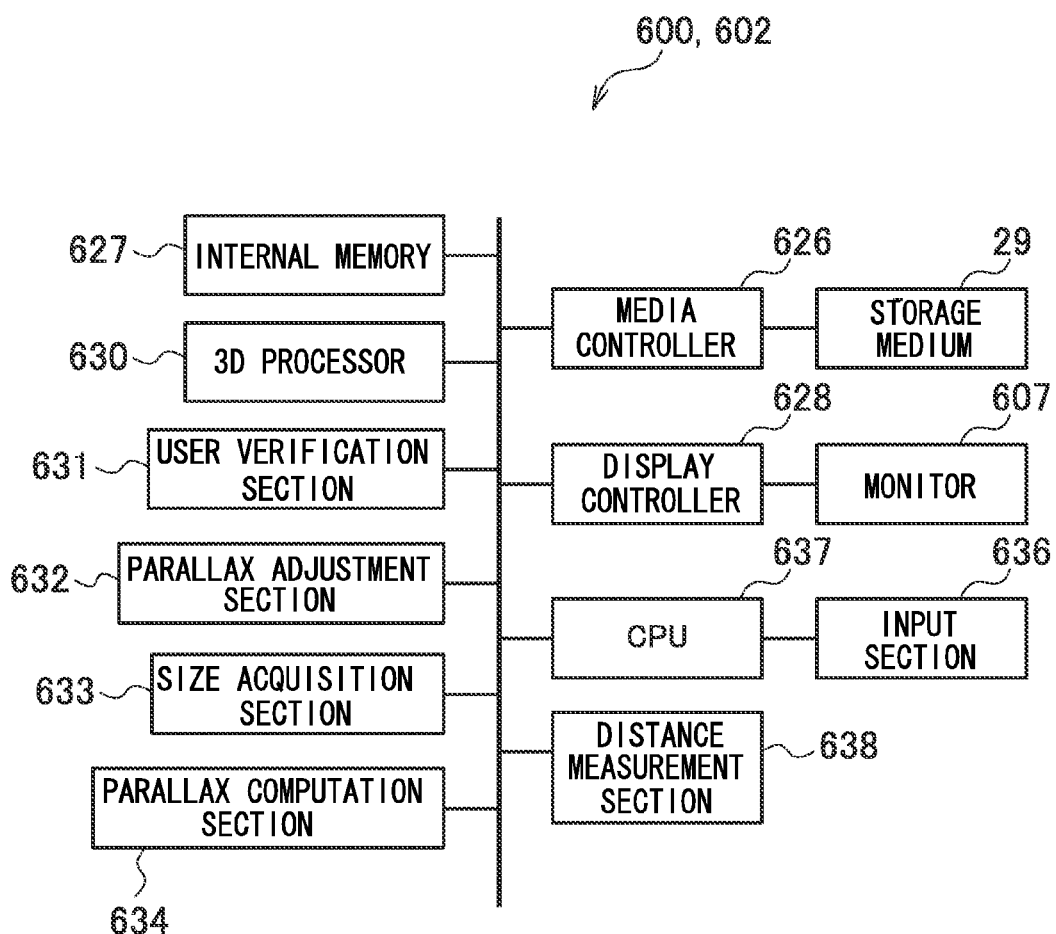
FIG. 17 is a schematic block diagram illustrating an internal configuration of a display device according to a sixth present exemplary embodiment.

As shown in FIG. 17, each of display devices 600, 602 other than the multi-lens digital camera 1 respectively includes a liquid crystal monitor 607, a media controller 626, an internal memory 627, a display controller 628, an input section 636, a CPU 637 and a distance measurement section 638.

The media controller 626 accesses the storage medium 29 and controls writing and reading of data such as image files.

The internal memory 627 stores items such as the width of display size of the respective display device, various constants set in the display device, and programs executed by the CPU 637.

The display controller 628 displays on the liquid crystal monitor 607 a left image and a right image, or a 3D image, stored in the storage medium 29.

The liquid crystal monitor 607 are configured according to the 3D display method (for example, a method employing a lenticular sheet, or a method employing shutter glasses) employed in the respective display device.

The distance measurement section 638 includes a distance measurement sensor and measures the viewing distance of a user.

Each of the display devices 600, 602, other than the multi-lens digital camera 1, further includes a 3D processor 630, a user verification section 631, a parallax adjustment section 632, a size acquisition section 633, and a parallax computation section 634.

The 3D processor 630 performs 3D processing on a left image and a right image in order to perform 3D display of the left image and the right image on the liquid crystal monitors 607, and generate a 3D image according to the 3D display method employed in the display device.

The user verification section 631 receives a user ID input by a user via the input section 636, cross-checks the user ID against a pre-stored list of user IDs, and performs user verification.

The parallax adjustment section 632 adjusts parallax of a left image and a right image according to user's operation of the input sections 636. The user is able to appropriately set the 3D sensation of image subjects included in a 3D image by manually adjusting the parallax. The parallax adjustment section 632 adjusts parallax of the left image and the right image of a 3D image file that has been stored in advance in the storage medium 29, and stores the adjustment results in the 3D image file stored in the storage medium 29. The parallax adjustment section 632 also stores the display size (for example, the lateral width of the display screen) of the liquid crystal monitor 607 in association with the adjustment results in the 3D image file.

The size acquisition section 633 acquires a display size (for example, lateral width of the display screen) for the display device from the internal memories 627.

The parallax computation section 634 computes, after the width of display size of the display device has been acquired by the size acquisition section 633, the parallax of the left image and the right image corresponding to the width of display size of the display device, based on the parallax adjustment results and the width of display size for another display device stored in the 3D image file. The parallax amount computation method is similar to that of the first exemplary embodiment and, therefore, explanation thereof is omitted.

Next, explanation follows regarding operation of the sixth exemplary embodiment. Firstly, a user inputs a user ID by operating the input section 36 of the multi-lens digital camera 1 in which the storage medium 29 has been installed, and the multi-lens digital camera 1 performs user verification. The multi-lens digital camera 1 performs 3D processing on a left image and a right image of a specific 3D image file that has been stored in advance in the storage medium 29 to generate a 3D image, and performs 3D display of the left image and the right image on the liquid crystal monitor 7. The user may then operate the input section 36 to adjust the parallax of the left image and the right image, and the parallax adjustment results and the width of display size of the liquid crystal monitor 7 are stored in association with the user ID in the designated 3D image file by the multi-lens digital camera 1.

Next, the storage medium 29 may be installed in the other display device 600 (for example, a 3D display television). After a user operates the input section 636 of the display device 600 to input a user ID, the display device 600 performs user verification. The display device 600 also performs 3D display of the left image and the right image of the specific 3D image file stored in advance in the storage medium 29. The user may then operate the input section 636 of the display device 600 to perform parallax adjustment of the left image and the right image, and the parallax adjustment results and the width of display size of the display device 600 are stored in association with the user ID in the designated 3D image file by the display device 600.

Figure 18:
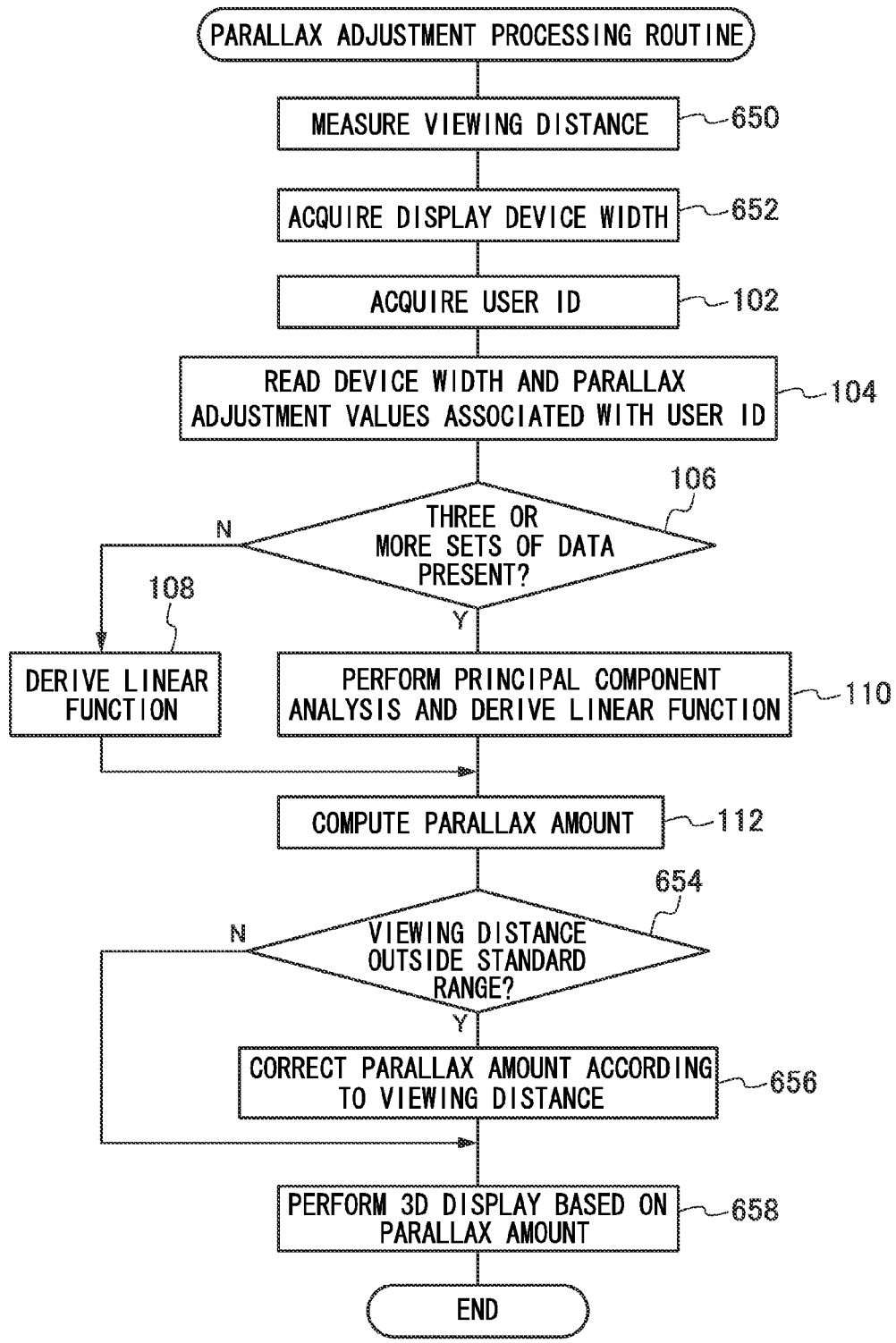
FIG. 18 is a flow chart illustrating a parallax adjustment processing routine of a sixth exemplary embodiment.

Next, the storage medium 29 may be installed in yet another display device, the display device 602. After a user operates the input section 636 of the display device 602 to input a user ID, the display device 602 performs user verification. The CPU 637 of the display device 602 then executes a parallax adjustment processing routine illustrated in FIG. 18. The processing similar to that of the first exemplary embodiment is allocated the same reference numerals and detailed explanation thereof is omitted.

Firstly, at step 650, the distance measurement section 638 measures the viewing distance to the user. Then at step 652, a width of display size for the display device 602 is acquired. At step 102, a user-verified user ID is acquired, and at step 104, plural combinations of parallax adjustment results and width of display sizes of display devices stored in association with the acquired user ID are read from the specific 3D image file that is stored in the storage medium 29.

Then at step 106, determination is made as to whether or not the number of data sets acquired at step 104 is three or greater. If the number of acquired data sets is two, at step 108, the slope and intercept of a linear function expressing a relationship between width of display size and parallax are derived. However, if it is determined at step 106 that the number of acquired data sets is three or greater, at step 110, principal component analysis is performed and a linear function expressing a relationship between display size and parallax is derived.

At the next step 112, a parallax amount corresponding to the width of display size acquired at step 100 is computed according to the linear function derived at step 108 or step 110.

Then, at step 654, determination is made as to whether or not the viewing distance measured at step 650 is outside of a predetermined viewing distance standard range for the width of display size acquired at step 652. If the viewing distance is within the predetermined viewing distance standard range for the width of display size, at step 658, 3D display of the left image and the right image of the specific 3D image file is performed on the liquid crystal monitor 607 of the display device 602 based on the parallax amount computed at step 112, and the parallax adjustment processing routine is ended.

However, if it is determined at step 654 that the viewing distance measured at step 650 is outside of the predetermined standard viewing distance range for the width of display size, at step 656, the parallax amount computed at step 112 is corrected according to whether the measured viewing distance exceeds the standard range, or equal to or below the standard range. For example, if the measured viewing distance exceeds the standard range, correction is made so as to increase the computed parallax amount. However, if the measured viewing distance is equal to or below the standard range, correction is made so as to decrease the computed parallax amount.

Then at step 658, the liquid crystal monitor 607 of the display device 602 performs 3D display of the left image and the right image of the designated 3D image file based on the parallax amount corrected at step 656, and the parallax adjustment processing routine is ended.

As described above, according to the sixth exemplary embodiment, an appropriate parallax amount can be automatically computed for each of plural types of display devices by computing a parallax amount for the display size of the output target display device based on a relationship between parallax amounts manually adjusted by a user and display sizes that has been determined for another display device.

The technology for performing parallax adjustment and computing parallax amount on respective display devices described in the sixth exemplary embodiment may also be applied to any of the second exemplary embodiment to the fifth exemplary embodiment described above.

The technology for measuring viewing distance described in the sixth exemplary embodiment may also be applied to any of the first exemplary embodiment to the fifth exemplary embodiment described above.

Moreover, embodiments are not limited to the configuration described in the first exemplary embodiment to the sixth exemplary embodiment explanation, in which the distance of image subject is measured from a focal position determined by the AF processor. For example, the distance of image subject may be measured using stereo matching of images obtained from the image capture sections 21A, 21B.

The parallax adjustment processing routines of the first exemplary embodiment to the sixth exemplary embodiment may be made into one or more programs that are executed by the CPU.

What is claimed is:

1. An image processing device comprising:
   a size acquisition section that acquires a first display size of an output target display device that performs 3D display;
   a storage section that stores respective parallax amounts that have been manually adjusted by a user during performing 3D display of 3D display image data respectively on display devices of different types, and stores respective second display sizes of the display devices;
   a parallax amount computation section that computes a parallax amount for the first display size based on a relationship between the parallax amounts and the second display sizes stored in the storage section;
   an output section that outputs to the output target display device the computed parallax amount and the 3D display image data;
   a type acquisition section that acquires a type of the output target display device; and
   a correction section that, corrects the computed parallax amount according to a predetermined viewing distance for the acquired type,
   wherein the output section outputs to the output target display device the parallax amount corrected by the correction section and the 3D display image data,
   wherein the storage section stores the parallax amounts that have been manually adjusted by the user and the second display size in an image file of the 3D display image data.

2. The image processing device of claim 1, further comprising a reception section that receives user data indicating a user,
   wherein the storage section stores the respective parallax amounts that have been manually adjusted by the user and the respective second display sizes in association with each user data; and
   the parallax amount computation section computes the parallax amount for the first display size based on the relationship between the parallax amounts and the second display sizes stored in the storage section, which corresponds to the user data received by the reception section.

3. The image processing device of claim 2, further comprising:
   a type acquisition section that acquires a type of the output target display device; and
   a correction section that, corrects the computed parallax amount according to the acquired type and a predetermined viewing distance corresponding to the received user data,
   wherein the output section outputs to the output target display device the parallax amount corrected by the correction section and the 3D display image data.

4. The image processing device of claim 1, further comprising:
- a display section that performs 3D display;
- a measuring section that measures a viewing distance from the display section to a user; and
- a correction section that compares a predetermined viewing distance corresponding to the first display size and the viewing distance measured by the measuring section, and corrects the computed parallax amount based on a result of comparison,
- wherein the output section outputs to the output target display device the parallax amount corrected by the correction section and the 3D display image data.

5. The image processing device of claim 1, further comprising a parallax range acquisition section that acquires a parallax range of an image subject from the 3D display image data,
- wherein in a case in which second 3D display image data that is different from first 3D display image data for which a parallax amount has been adjusted is to be output, the parallax amount computation section computes a parallax amount of the second 3D display image data based on the parallax range acquired from the first 3D display image data, the parallax range acquired from the second 3D display image data, and the parallax amount of the first 3D display image data, and
- the output section outputs to the output target display device the computed parallax amount and the second 3D display image data.

6. The image processing device of claim 1, further comprising an image subject distance acquisition section that acquires an image subject distance from 3D display image data,
- wherein in a case in which second 3D display image data that is different from first 3D display image data for which a parallax amount has been adjusted is to be output, the parallax amount computation section computes a parallax amount of the second 3D display image data based on the image subject distance acquired from the first 3D display image data, the image subject distance acquired from the second 3D display image data, and the parallax amount of the first 3D display image data, and
- the output section outputs to the output target display device the computed parallax amount and the second 3D display image data.

7. The image processing device of claim 1, further comprising a display section that performs 3D display.

8. The image processing device of claim 1, further comprising an image capture section that captures a plurality of images from a plurality of different viewpoints,
- wherein the output section outputs the captured plurality of images as the 3D display image data.

9. An image processing method comprising:
- storing respective parallax amounts that have been manually adjusted by a user during performance of 3D display of 3D display image data respectively on display devices of different types, and respective second display sizes of the display devices;
- acquiring a first display size of an output target display device that performs 3D display;
- computing a parallax amount for the first display size based on a relationship between the stored parallax amounts and the stored second display sizes;
- outputting to the output target display device the computed parallax amount and the 3D display image data;
- acquiring a type of the output target display device;
- correcting the computed parallax amount according to a predetermined viewing distance for the acquired type, and
- outputting to the output target display device the corrected parallax amount and the 3D display image data,
- wherein the parallax amounts that have been manually adjusted by the user and the second display size are stored in an image file of the 3D display image data.

10. The image processing method of claim 9, further comprising:
- receiving user data indicating a user;
- storing the respective parallax amounts adjusted by the user and the respective second display sizes in association with each user data; and
- computing the parallax amount for the first display size based on the relationship between the parallax amounts and the second display sizes stored in the storage section, which corresponds to the received user data.

11. The image processing method of claim 10, further comprising:
- acquiring a type of the output target display device;
- correcting the computed parallax amount according to the acquired type and a predetermined viewing distance corresponding to the received user data; and
- outputting to the output target display device the corrected parallax amount and the 3D display image data.

12. The image processing method of claim 9, further comprising:
- performing 3D display of the 3D display image data on a display section;
- measuring a viewing distance from the display section to a user;
- comparing a predetermined viewing distance corresponding to the first display size and the measured viewing distance, and correcting the computed parallax amount based on a result of the comparing; and
- outputting to the output target display device the corrected parallax amount and the 3D display image data.

13. The image processing method of claim 9, further comprising:
- acquiring a parallax range of an image subject from first 3D display image data for which the parallax amount has been adjusted and from second 3D display image data that is different from the first 3D display image data;
- computing a parallax amount of the second 3D display image data based on the parallax range acquired from the first 3D display image data, the parallax range acquired from the second 3D display image data, and the parallax amount of the first 3D display image data; and
- outputting to the output target display device the computed parallax amount and the second 3D display image data.

14. The image processing method of claim 9, further comprising:
- acquiring an image subject distance from first 3D display image data for which the parallax amount has been adjusted and from second 3D display image data that is different from the first 3D display image data;
- computing a parallax amount of the second 3D display image data based on the image subject distance acquired from the first 3D display image data, the image subject distance acquired from the second 3D display image data, and the parallax amount of the first 3D display image data; and
- outputting to the output target display device the computed parallax amount and the second 3D display image data.

15. The image processing method of claim 9, wherein the 3D display image data comprises a plurality of images that are captured from a plurality of different viewpoints.

16. A non-transitory storage medium storing a program that causes a computer to execute image processing, the image processing comprising:
- storing respective parallax amounts that have been manually adjusted by a user during performance of 3D display of 3D display image data respectively on display devices of different types, and respective second display sizes of the display devices;
- acquiring a first display size of an output target display device that performs 3D display;
- computing a parallax amount for the first display size based on a relationship between the stored parallax amounts and the stored second display sizes;
- outputting to the output target display device the computed parallax amount and the 3D display image data;
- acquiring a type of the output target display device;
- correcting the computed parallax amount according to a predetermined viewing distance for the acquired type, and
- outputting to the output target display device the corrected parallax amount and the 3D display image data,
- wherein the parallax amounts that have been manually adjusted by the user and the second display size are stored in an image file of the 3D display image data.

17. The image processing device of claim 2, wherein the user data is a user ID used for verification of the user.

18. The image processing device of claim 5, wherein the parallax range is a distance along an optical axis between an image subject that has the shortest distance and an image subject that has the greatest distance from a multi-lens digital camera that has obtained the 3D display image data, among image subjects in the 3D display image data with a certain level or greater edge component.

19. The image processing device of claim 5, wherein the parallax range is a distance along an optical axis between an image subject that has the shortest distance and an image subject that has the greatest distance from a multi-lens digital camera that has obtained the 3D display image data, among image subjects in the 3D display image data with a certain level or greater parallax.

20. The image processing method of claim 10, wherein the user data is a user ID used for verification of the user.

21. The image processing method of claim 13, wherein the parallax range is a distance along an optical axis between an image subject that has the shortest distance and an image subject that has the greatest distance from a multi-lens digital camera that has obtained the 3D display image data, among image subjects in the 3D display image data with a certain level or greater edge component.

22. The image processing method of claim 13, wherein the parallax range is a distance along an optical axis between an image subject that has the shortest distance and an image subject that has the greatest distance from a multi-lens digital camera that has obtained the 3D display image data, among image subjects in the 3D display image data with a certain level or greater parallax.

* * * * *